US012190346B1

(12) United States Patent
Ugane et al.

(10) Patent No.: US 12,190,346 B1
(45) Date of Patent: Jan. 7, 2025

(54) SYSTEM AND METHOD FOR SUPPORTING EFFECTIVE CAMPAIGN MANAGEMENT IN A CLOUD-BASED CONTACT CENTER PLATFORM

(71) Applicant: NICE LTD., Ra'anana (IL)

(72) Inventors: Amit Ugane, Pune (IN); Gourav Mandhane, Pune (IN); Harshal Dhake, Pune (IN); Prakash Walkoli, Pune (IN); Prashant Kulkarni, Pune (IN); Shrikant Lavhate, Navi Mumbai (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 18/215,193

(22) Filed: Jun. 28, 2023

(51) Int. Cl.
  *G06Q 30/02* (2023.01)
  *G06Q 30/0242* (2023.01)

(52) U.S. Cl.
  CPC .............................. *G06Q 30/0242* (2013.01)

(58) Field of Classification Search
  CPC .. G06Q 30/0244; G06Q 50/01; G06F 3/0482; H04N 7/147
  See application file for complete search history.

(56) References Cited

U.S. PATENT DOCUMENTS

| | | | | |
|---|---|---|---|---|
| 2013/0325587 | A1* | 12/2013 | Kothari | G06Q 30/0243 705/14.42 |
| 2014/0028780 | A1* | 1/2014 | Croen | H04N 7/147 348/14.03 |
| 2017/0372356 | A1* | 12/2017 | Frommann | G06Q 30/0246 |
| 2020/0412874 | A1* | 12/2020 | Paiva | H04L 67/60 |
| 2021/0132748 | A1* | 5/2021 | Paiva | G06F 3/0482 |
| 2021/0133848 | A1* | 5/2021 | Ghorbani | G06Q 50/01 |
| 2021/0201359 | A1* | 7/2021 | Sekar | G06Q 30/0244 |

* cited by examiner

*Primary Examiner* — Saba Dagnew
(74) *Attorney, Agent, or Firm* — SOROKER AGMON NORDMAN RIBA

(57) ABSTRACT

A system for supporting effective campaign management in a cloud-based contact center platform. The system includes a campaign analytics engine. The campaign analytics engine includes retrieving campaign offerings of a running campaign; retrieving time-stamped text transcripts of interactions of agents of the running campaign; parsing the retrieved time-stamped text transcripts of interactions to yield parsed transcripts and related customer sentiment; comparing the yielded parsed transactions with the retrieved campaign offerings to generate analytical data. The generated analytical data includes at least one of: (i) agent campaign delivery effectiveness score; and (ii) probability of conversion. When an agent has an agent campaign delivery effectiveness score below a first threshold excluding the agent from the running campaign and sending the campaign delivery effectiveness score of the agent along with agent details and a preconfigured training list to be assigned to the agent by a QM application.

13 Claims, 16 Drawing Sheets

| Prospects for Campaign | Interested Prospect | Not Interested Prospect |
|---|---|---|
| 100 | 30 | 70 |

| Offerings | Cash back on Gas Payment | | | Low APR | | | Balance Transfer | | |
|---|---|---|---|---|---|---|---|---|---|
| | Positive | Negative | Neutral | Positive | Negative | Neutral | Positive | Negative | Neutral |
| Interested customer sentiment (30) | 20 | 7 | 3 | 25 | 2 | 3 | 15 | 5 | 10 |
| not Interested customer sentiment (70) | 15 | 50 | 5 | 12 | 38 | 20 | 15 | 30 | 25 |
| Conversion Rate per offering | 35% | | | 37% | | | 30% | | |

SYSTEM AND METHOD FOR SUPPORTING EFFECTIVE CAMPAIGN MANAGEMENT IN A CLOUD-BASED CONTACT CENTER PLATFORM

TECHNICAL FIELD

The present disclosure relates to the field of data analytics, and more specifically to supporting effective campaign management in a cloud-based contact center platform.

BACKGROUND

Current systems for campaign management for tenants in a cloud-based environment, provide limited data for analytics of the campaigns. For example, the number of dialed contacts or the sentiments of the dialed contact or agent while the campaign was executed. However, this information is not sufficient to determine the campaign's effectiveness in terms of customer conversion. Poor campaign management may lead to revenue loss for tenants who aim to expand their customer base by running a campaign for customer conversion.

Accordingly, there is a need for a technical solution for supporting effective campaign management in a cloud-based contact center platform.

SUMMARY

There is thus provided, in accordance with some embodiments of the present disclosure, a system for supporting effective campaign management in a cloud-based contact center platform.

Furthermore, in accordance with some embodiments of the present disclosure, the system may include a Microservice (MS) for campaign management of a tenant connected to the cloud-based contact center platform; a campaign configuration dashboard connected to the MS for campaign management for configuration of campaign offerings of the tenant to be stored in a campaign database: a transcription serverless computing platform to receive time-stamped text transcripts from an automatic speech recognition service and store it in a real-time transcription text database; and a campaign analytics engine integrated to the cloud-based contact center platform.

Furthermore, in accordance with some embodiments of the present disclosure, the campaign analytics engine may include retrieving campaign offerings of a running campaign from the campaign database; retrieving time-stamped text transcripts of interactions of agents of the running campaign from the real-time transcription text database; parsing the retrieved time-stamped text transcripts of interactions of agents of the running campaign via pretrained speech-to-text and Natural Language Processing (NLP) models to yield parsed transcripts and related customer sentiment; and comparing the yielded parsed transactions with the retrieved campaign offerings to generate analytical data.

Furthermore, in accordance with some embodiments of the present disclosure, the time-stamped text transcripts may be based on real-time outbound interactions by agents of the tenant, which are intercepted from a contact-handling web application that is integrated to the MS for campaign management of the tenant.

Furthermore, in accordance with some embodiments of the present disclosure, the generated analytical data may include at least one of: (i) agent campaign delivery effectiveness score; and (ii) probability of conversion.

Furthermore, in accordance with some embodiments of the present disclosure, when an agent has an agent campaign delivery effectiveness score below a first threshold, excluding the agent from the running campaign and sending the campaign delivery effectiveness score of the agent along with agent details and a preconfigured training list to be assigned to the agent by a Quality Management (QM) application.

Furthermore, in accordance with some embodiments of the present disclosure, when the probability of conversion is below a second threshold automatically the campaign analytics engine may reconfigure the campaign offerings based on predetermined offerings.

Furthermore, in accordance with some embodiments of the present disclosure, the agent campaign delivery effectiveness score may determine voice interaction capabilities. The agent campaign delivery effectiveness score may be calculated by: identifying offerings of the campaign offerings in the yielded parsed transcripts where related interactions thereof are: (i) having positive customer sentiment to count a number of positive offerings; (ii) having negative customer sentiment to count a number of negative offerings; and (iii) having neutral customer sentiment to count a number of neutral offerings: identifying offerings of the campaign offerings which are not mentioned in the yielded parsed transcripts to count a number of offerings not discussed; summing the number of negative offerings, the number of neutral offerings and the number of offerings not discussed to yield a sum of non-positive offerings; and dividing the number of positive offerings by the sum of non-positive offerings to yield the agent campaign delivery effectiveness score.

Furthermore, in accordance with some embodiments of the present disclosure, the probability of conversion may be calculated by a conversion model. The conversion model may be trained by: (i) providing a dataset of interactions and associated customer sentiment, the customer sentiment may be selected from: (a) positive: (b) negative; and (c) neutral; converting each interaction and associated customer sentiment in the dataset into binary features to yield a converted dataset; training the conversion model based on a first portion of the converted dataset by using a supervised classification algorithm, to predict likelihood of customer getting converted by campaign offerings. The supervised classification algorithm may be a binary logistic regression; and (ii) using a second portion of the converted dataset for testing of the conversion model.

Furthermore, in accordance with some embodiments of the present disclosure, after the calibrated training of the agent and training thereof, operating an agent performance calculation and when the calculated agent performance is above a third threshold the agent may be reincluded in the running campaign.

Furthermore, in accordance with some embodiments of the present disclosure, the running campaign may be configured via the campaign configuration dashboard to include one or more campaign offerings and one or more customers which are prospects of the running campaign, and the campaign offerings may include a question bank as a guideline that agents may follow when talking to the customers which are prospects of the running campaign.

Furthermore, in accordance with some embodiments of the present disclosure, the campaign configuration dashboard may be implemented as a web application and integrated seamlessly with the MS for campaign management.

Furthermore, in accordance with some embodiments of the present disclosure, the campaign database and the real-time transcription text database may be each implemented by a non-relational database service, managed by a platform for cloud computing services.

Furthermore, in accordance with some embodiments of the present disclosure, the campaign analytics engine may be implemented by a campaign analytics serverless computing platform, and the campaign analytics serverless computing platform may be training and testing the campaign analytics engine based on periodic data of the ongoing campaign retrieved from the real-time transcription text database to generate the analytical data.

Furthermore, in accordance with some embodiments of the present disclosure, the periodic data may be time-stamped text transcripts of interactions related to the running campaign.

Furthermore, in accordance with some embodiments of the present disclosure, a media server may be configured to record agent interactions and forward audio data of each recorded interaction to a listening service that feeds the audio data to a serverless streaming data service to get real-time interaction data and the automatic speech recognition service may be configured to generate time-stamped text transcripts from the real-time interaction data and store it in a real-time transcription text database.

Furthermore, in accordance with some embodiments of the present disclosure, the time-stamped text transcripts may be generated after the campaign analytics engine receiving a notification from the tenant as to the running campaign and requesting the media server to commence recording interactions related to the one or more customers which are prospects of the running campaign.

Furthermore, in accordance with some embodiments of the present disclosure, the analytical data may further include campaign offerings having customer interest below a preconfigured level and reasons for customer interest below the preconfigured level.

There is further provided, in accordance with some embodiments of the present disclosure, a computerized-implemented method for effective campaign management in a cloud-based contact center platform.

Furthermore, in accordance with some embodiments of the present disclosure, the computer-implemented method may include operating a campaign analytics engine integrated to the cloud-based contact center platform. The campaign analytics engine may include retrieving campaign offerings of a running campaign from the campaign database; retrieving time-stamped text transcripts of interactions of agents of the running campaign from the real-time transcription text database; parsing the retrieved time-stamped text transcripts of interactions of agents of the running campaign via pretrained speech-to-text and Natural Language Processing (NLP) models to yield parsed transcripts and related customer sentiment; comparing the yielded parsed transactions with the retrieved campaign offerings to generate analytical data. The time-stamped text transcripts may be based on real-time outbound interactions by agents of the tenant, which are intercepted from a contact-handling web application that is integrated to the MS for campaign management of the tenant. The generated analytical data may include at least one of: (i) agent campaign delivery effectiveness score; and (ii) probability of conversion. When an agent has an agent campaign delivery effectiveness score below a first threshold, excluding the agent from the running campaign and sending the campaign delivery effectiveness score of the agent along with agent details and a preconfigured training list to be assigned to the agent by a Quality Management (QM) application.

BRIEF DESCRIPTION OF THE DRAWINGS

FIG. 4B is an example of a calculation of conversion rate for a single offering, in accordance with some embodiments of the present disclosure;

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Current systems for campaign management for tenants in a cloud-based environment, provide limited data for analytics of the campaigns.

Therefore, there is a need for method and system for supporting effective campaign management in a cloud-based contact center platform.

Figure 1A:
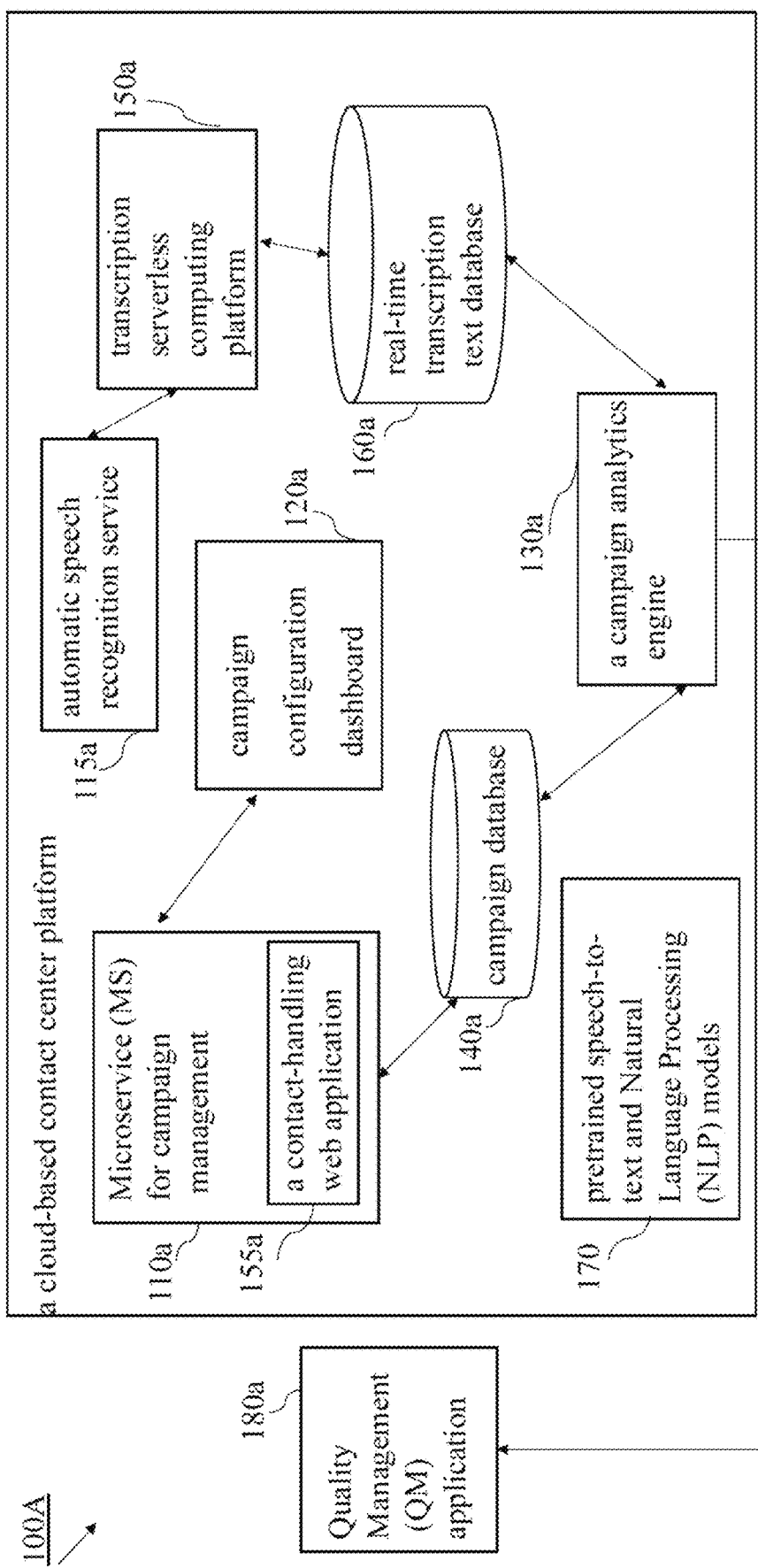
FIGS. 1A-1B schematically illustrate a high-level diagram of a system for supporting effective campaign management in a cloud-based contact center platform, in accordance with some embodiments of the present disclosure.

FIG. 1A schematically illustrates a high-level diagram of a system 100A for supporting effective campaign management in a cloud-based contact center platform, in accordance with some embodiments of the present disclosure.

According to some embodiments of the present disclosure, a cloud-based contact center platform provides tenants with the ability to run campaigns. A system, such as system 100A may provide analytical data that may assist in better managing a running campaign. The analytical data may be for example, agent campaign delivery effectiveness score and probability of conversion.

According to some embodiments of the present disclosure, system 100A may include a Microservice (MS), such as MS for campaign management 110a of a tenant, which may be connected to the cloud-based contact center platform. A dashboard, such as campaign configuration dashboard 120 may be connected to the MS for campaign management 110a for configuration of campaign offerings of the tenant to be stored in a database, such as campaign database 140a.

According to some embodiments of the present disclosure, system 100A may further include a transcription serverless computing platform 150a to receive time-stamped text transcripts from an automatic speech recognition service and store it in a real-time transcription text database 160a. The time-stamped text transcripts are based on real-time outbound interactions by agents of the tenant, which are intercepted from a contact-handling web application 155a that may be integrated to the MS for campaign management 110a.

According to some embodiments of the present disclosure, a campaign analytics engine 130a may be integrated to the cloud-based contact center platform. The campaign analytics engine 130a, such as campaign analytics engine 200 in FIG. 2, may include retrieving campaign offerings of a running campaign from the campaign database 140a. Then, retrieving time-stamped text transcripts of interactions of agents of the running campaign from the real-time transcription text database 160a. The retrieved time-stamped text transcripts of interactions of agents of the running campaign may be parsed via pretrained speech-to-text and Natural Language Processing (NLP) models to yield parsed transcripts and related customer sentiment.

According to some embodiments of the present disclosure, the campaign analytics engine 130a may further compare the yielded parsed transactions with the retrieved campaign offerings to generate analytical data. The generated analytical data may include at least one of: (i) agent campaign delivery effectiveness score; and (ii) probability of conversion. When an agent has an agent campaign delivery effectiveness score below a first threshold the agent may be excluded from the running campaign and the campaign delivery effectiveness score of the agent may be sent to a Quality Management (QM) application 180a. The campaign delivery effectiveness score of the agent may be sent along with agent details and a preconfigured training list to be assigned to the agent by the QM application 180a.

According to some embodiments of the present disclosure, when the probability of conversion is below a second threshold automatically the campaign offerings may be reconfigured based on predetermined offerings by a campaign management service, such as MS for campaign management 110a.

According to some embodiments of the present disclosure, the agent campaign delivery effectiveness score may be an indication of voice interaction capabilities of the agent. The agent campaign delivery effectiveness score may be calculated by identifying offerings of the campaign offerings in the yielded parsed transcripts where related interactions thereof are: (i) having positive customer sentiment to count a number of positive offerings: (ii) having negative customer sentiment to count a number of negative offerings; and (iii) having neutral customer sentiment to count a number of neutral offerings.

According to some embodiments of the present disclosure, offerings of the campaign offerings which are not mentioned in the yielded parsed transcripts may be identified and counted to provide a number of offerings which were not discussed. Then, the number of negative offerings, the number of neutral offerings and the number of offerings not discussed may be summed to yield a sum of non-positive offerings. The number of positive offerings may be divided by the sum of non-positive offerings to yield the agent campaign delivery effectiveness score.

Figure 1B:
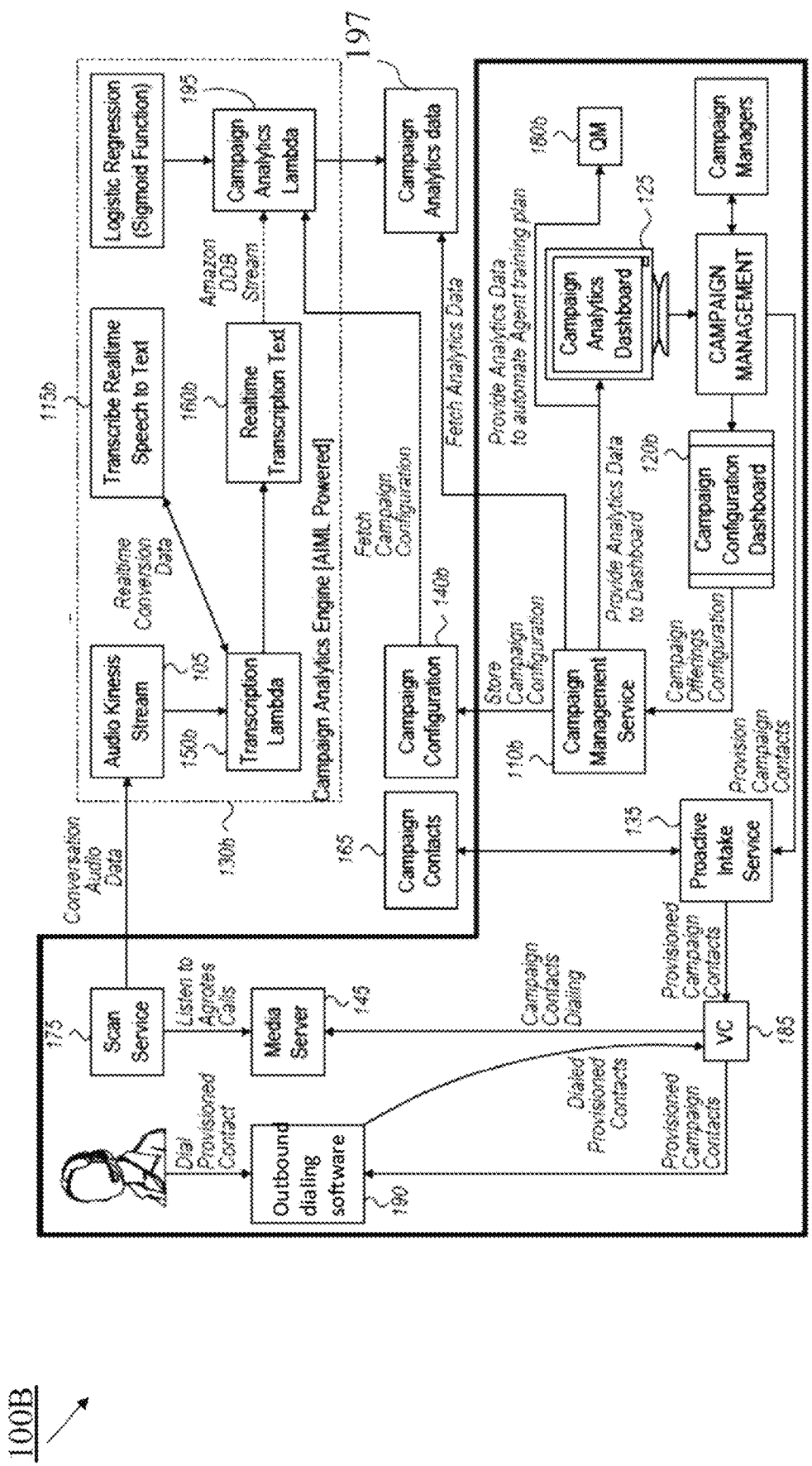

According to some embodiments of the present disclosure, the probability of conversion may be calculated by a conversion model, such as campaign analytics Lambda 195 in FIG. 1B. The conversion model may be trained by a dataset of interactions and associated customer sentiment. The customer sentiment may be selected from: (a) positive; (b) negative; and (c) neutral. Then, converting each interaction and associated customer sentiment in the dataset into binary features to yield a converted dataset, and training the conversion model based on a first portion of the converted dataset by using a supervised classification algorithm, to predict likelihood of customer getting converted by campaign offerings, and then using a second portion of the converted dataset for testing of the conversion model.

According to some embodiments of the present disclosure, the supervised classification algorithm may be a binary logistic regression.

According to some embodiments of the present disclosure, after a calibrated training the campaign management microservice (MS) 110a may provide a preconfigured training list to the Quality Management (QM) application 180a which in turn may assign respective trainings to targeted agents of the agent and training thereof, operating an agent performance calculation and when the calculated agent performance is above a third threshold the agent may be reincluded in the running campaign.

Figure 3:
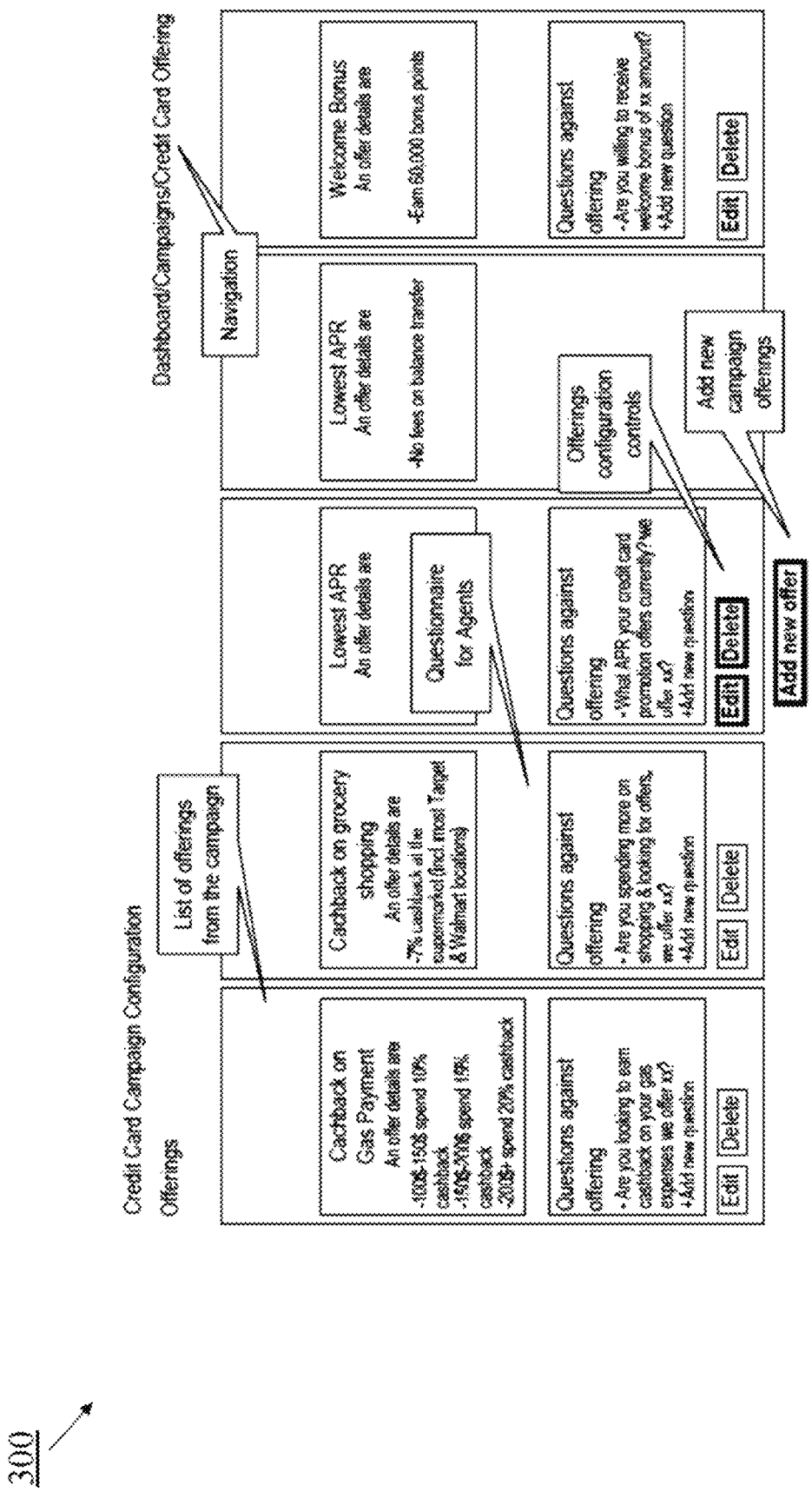
FIG. 3 is an example of a configuration dashboard, in accordance with some embodiments of the present disclosure.

According to some embodiments of the present disclosure, the running campaign may be configured via the campaign configuration dashboard 120a to include one or more campaign offerings and one or more customers which are prospects of the running campaign. The campaign offerings may include a question bank for example, as shown in FIG. 3, which may be used as a guideline that agents may follow when talking to the customers which are prospects of the running campaign.

According to some embodiments of the present disclosure, the campaign configuration dashboard 120a may be implemented as a web application and may be integrated seamlessly with the MS for campaign management 110a.

According to some embodiments of the present disclosure, the campaign database 140a and the real-time transcription text database 160a may be each implemented by a non-relational database service, managed by the platform for cloud computing services.

According to some embodiments of the present disclosure, the campaign analytics engine 130a may be implemented by a campaign analytics serverless computing platform. The campaign analytics serverless computing platform may be training and testing the campaign analytics engine 130a based on periodic data of the ongoing campaign retrieved from the real-time transcription text database 160a to generate the analytical data.

According to some embodiments of the present disclosure, the periodic data may be time-stamped text transcripts of interactions related to the running campaign.

According to some embodiments of the present disclosure, a media server may be configured to record agent interactions and forward audio data of each recorded interaction to a listening service that feeds the audio data to a serverless streaming data service to get real-time interaction data. The automatic speech recognition service may be configured to generate time-stamped text transcripts from the real-time interaction data and store it in a real-time transcription text database 160a.

According to some embodiments of the present disclosure, the time-stamped text transcripts may be generated after the campaign analytics engine 130a may receive a notification from the tenant as to the running campaign and may request the media server to commence recording interactions related to the one or more customers which are prospects of the running campaign.

According to some embodiments of the present disclosure, the analytical data may further include campaign offerings having customer interest below a preconfigured level and reasons for the customer interest is below the preconfigured level. A transcription serverless computing platform such as transcription Lambda 150b in FIG. 1B may provide sentiments against customer conversation. These conversation sentiments may be mapped to configured offerings followed by campaign analytics engine 130a by a conversion model, such as campaign analytics Lambda 195 in FIG. 1B to derive the probability of customer conversion using binary logistic regression.

According to some embodiments of the present disclosure, system 100A may provide the effectiveness of campaign delivery by agent to a prospective customer via the agent campaign delivery effectiveness score and positive or negative sentiments related to the offerings of the running campaign. Campaign offerings that had a lower customer interest may be provided by the probability of conversion.

According to some embodiments of the present disclosure, the reason behind lower customer interest in the campaign offerings may be either the type of offerings or related to the agent performance, e.g., agent's communication ineffectiveness. The analytical data, i.e., agent campaign delivery effectiveness score and probability of conversion may be used to automatically exclude agents with low performance from the running campaign or reconfigure the campaign offerings based on predetermined offerings.

According to some embodiments of the present disclosure, optionally, the analytical data may aid campaign managers to decide whether to optimize or replace campaign offerings or tailor agent's training for a better campaign success rate or expunge an agent from a running campaign due to poor performance.

FIG. 1B schematically illustrates a high-level diagram of a system 100B for supporting effective campaign management in a cloud-based contact center platform, in accordance with some embodiments of the present disclosure.

According to some embodiments of the present disclosure, system 100A in FIG. 1A may be implemented, for example by components in system 100B.

According to some embodiments of the present disclosure, a campaign configuration dashboard 120a in FIG. 1A may be implemented by a campaign configuration dashboard 120b. The campaign configuration dashboard 120b may be configured to enable users, such as managers in a contact center to customize campaign offerings. The campaign configuration dashboard 120b may be implemented as an extension to the cloud-based contact center platform which may provide tenants with the ability to run campaigns. The campaign configuration dashboard 120b may be developed using a script-based web application, such as Angular 14.

According to some embodiments of the present disclosure, the campaign analytics engine 130a in FIG. 1A, may be implemented by campaign analytics engine 130b. The campaign analytics engine 130b may include an audio stream 105, an automatic speech recognition service, such as automatic speech recognition service 115a and such as real-time speech to text 115b, transcription serverless computing platform 150b, such as transcription serverless computing platform 150a, and a conversion model, such as campaign analytics Lambda 195.

According to some embodiments of the present disclosure, the conversion model, such as campaign analytics Lambda 195, may receive data from a supervised classification algorithm which may be a binary logistic regression.

Figure 14:
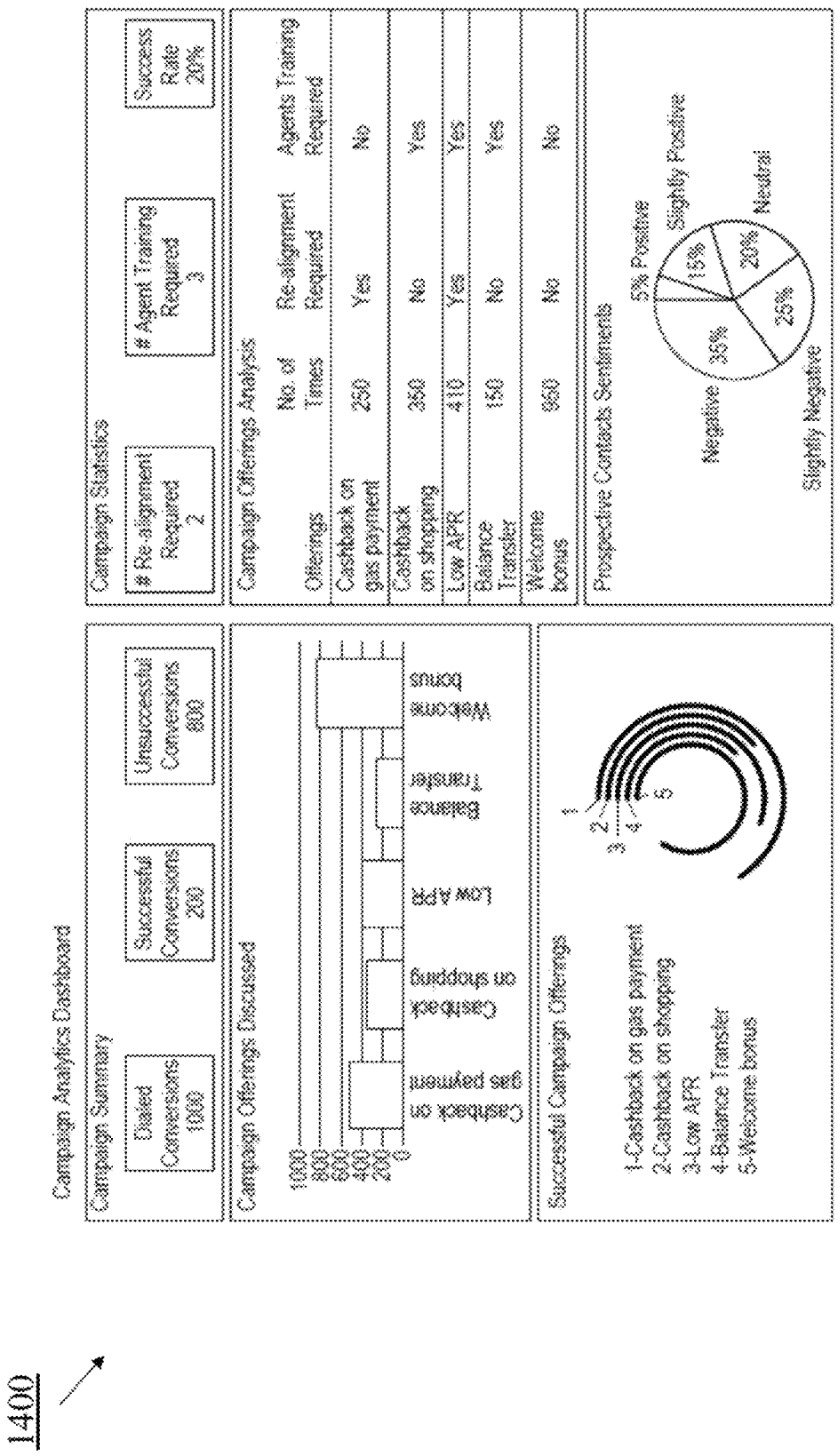
FIG. 14 is an example of a campaign analytics dashboard, in accordance with some embodiments of the present disclosure.

According to some embodiments of the present disclosure, a campaign analytics dashboard 125, for example as shown in FIG. 14, may present the analytical data generated by the campaign analytics engine 130b. The analytical data may include agent campaign delivery effectiveness score, probability of conversion, campaign summary offerings analytics, sentiments of prospects and the like. A campaign analytics dashboard 125 may be developed using a script-based web application such as Angular 14.

According to some embodiments of the present disclosure, a campaign management service, such as campaign management service 110b may be integrate with an MS, such as MS for campaign management 110a in FIG. 1A, and may enable users, such as managers in the contact center to configure campaign offerings via the campaign configuration dashboard 120b and to get real-time analytics via the campaign analytics dashboard 125.

According to some embodiments of the present disclosure, optionally, the campaign management service 110*b* may send the campaign delivery effectiveness score of the agent, along with agent details and a preconfigured training list to be assigned to the agent to a Quality Management (QM) application 180*b*, such as QM application 180*a* in FIG. 1A. The QM application 180*b* may use the preconfigured training list for agents training and also for sending notifications to users, such as managers of the running campaign for campaign re-alignment if required.

According to some embodiments of the present disclosure, a service, such as proactive intake service 135 may operate a process of requesting contacts, i.e., customers to be provisioned from campaign management and storing the contacts to a database, such as campaign contacts database 165. Later, when the campaign is running, the Virtual Cluster (VC) 185 may request the proactive intake service 135 to provide contacts i.e., prospective customers from the tenant that has initiated the running campaign.

According to some embodiments of the present disclosure, the VC 185 may be integrated with a media server 145, an outbound dialing software 190, an Automatic Calls Distribution (ACD) system and other platforms. Once proactive intake service 135 has provisioned the necessary of contacts for a campaign, the contacts may be accessible to the outbound dialing software. When an agent informs about the provisioned contacts using the outbound dialing software 190 client, the VC 185 may receive a notification and may requests the media server 145 to commence recording all agent calls related to those contacts.

According to some embodiments of the present disclosure, the outbound dialing software 190 client may be implemented as a contact-handling web application that enables to interact with contacts using phone calls, voicemail, email, chat, and work items.

According to some embodiments of the present disclosure, the media server 145 may record voice interactions of contacts of the running campaign and forward the recordings to a scan service 175. The scan service 175 may be implemented by an indexing and mining software for audio and video, such as Nexidia®.

According to some embodiments of the present disclosure, an audio data from the scan service 175 may be routed to an audio stream, such as audio Kinesis stream 105 to get real time conversation data.

According to some embodiments of the present disclosure, an automatic speech recognition service, such as automatic speech recognition service 115*a* in FIG. 1A and such as real time speech to text 115*b* may be implemented by Amazon Transcribe& which may convert the audio data to raw textual data.

According to some embodiments of the present disclosure, a transcription serverless computing platform, such as transcription serverless computing platform 150*a* may be implemented by transcription Lambda 150*b* of Amazon® and may receive raw conversation text from the automatic speech recognition service 115*a* in FIG. 1A and may transforms and store it in a database, such as real-time transcription text database 160*a* and such as real time transcription text database 160*b* for further analytics According to some embodiments of the present disclosure, a conversion model, such as campaign Lambda 195 may be trained and tested based on hourly/daily data received from a running campaign and may perform real time predication, such as campaign analytics data 197 for the rest of the campaign. The campaign analytics data may be retrieved by a service, such as campaign management service 110*b* to be sent to the QM application 180*b* for agents training. Optionally, the campaign analytics data 197 may be retrieved by the campaign management service 110*b* and may be used for notifying campaign managers for a need for campaign re-alignment or the data may be presented via campaign analytics dashboard 125, as shown in FIG. 14.

According to some embodiments of the present disclosure, the QM application 180*b*, such as QM application 180*a* in FIG. 1A, may be an application that provides agents performance analytics. In a system, such as system 100A in FIG. 1A and such as system 100B, the QM application 180*b* may be provided by a service, such as campaign management service 110*b*, with an agent campaign delivery effectiveness score, which may be below a first threshold along with agent details and a preconfigured training list to be assigned to the agent by the QM application 180*b*. The QM application 180*b* may automatically schedule one or more training sessions based on the received preconfigured training list for the agent.

According to some embodiments of the present disclosure, the databases, such as campaign contacts database 165, the campaign configuration database 140*b* and the real-time transcription text database 160*b* may be implemented by a non-relational database service, managed by the platform for cloud computing services. The non-relational database service may be for example, Amazon DynamoDB® which is schema-less, and a non-relational, key-value type of database.

Figure 12:
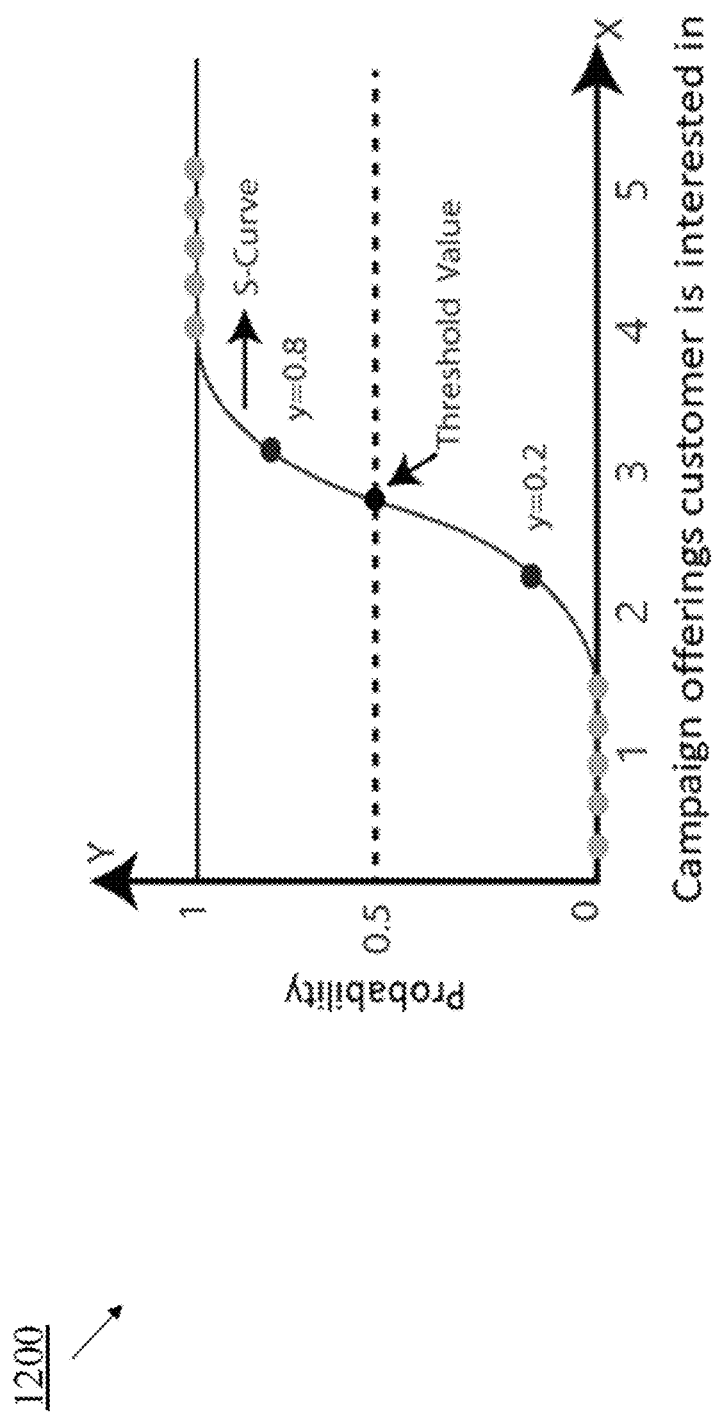
FIG. 12 is a graph showing probability of campaign offerings that a customer is interested in, in accordance with some embodiments of the present disclosure.

According to some embodiments of the present disclosure, a campaign analytics database may maintain data, such as contacts details, agents details, answers to campaign offerings questions, e.g., 'yes' or 'no' to each question for related offerings in the campaign and predictions calculated by a conversion model. The conversion model may be implemented as a supervised classification algorithm which may be a binary logistic regression, such as Sigmoid function, as shown in FIG. 12.

Figure 2:
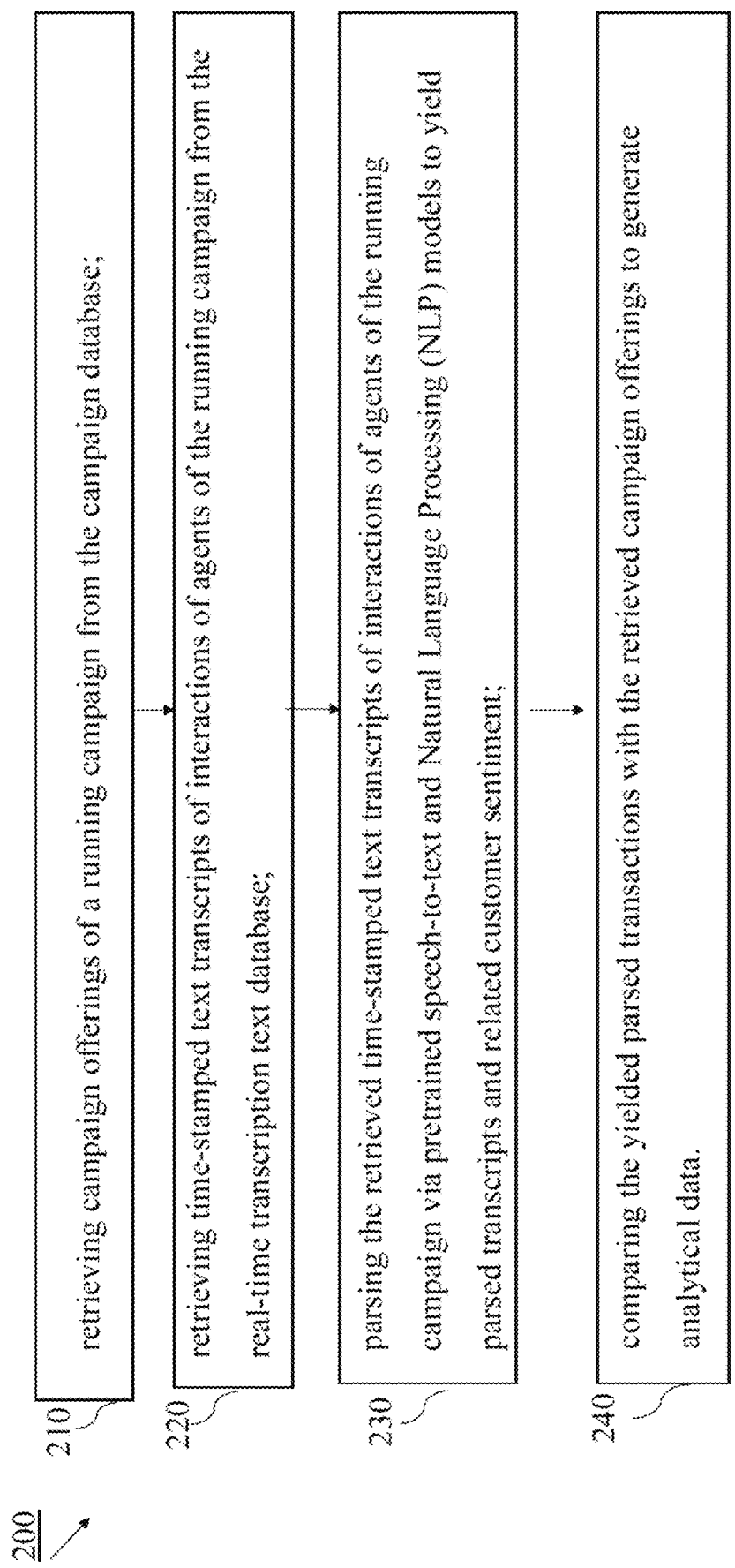
FIG. 2 is a high-level workflow of a campaign analytics engine that is integrated to the cloud-based contact center platform, in accordance with some embodiments of the present disclosure.

FIG. 2 is a high-level workflow 200 of a campaign analytics engine that is integrated to the cloud-based contact center platform, in accordance with some embodiments of the present disclosure.

According to some embodiments of the present disclosure, operation 210 comprising retrieving campaign offerings of a running campaign from the campaign database.

According to some embodiments of the present disclosure, operation 220 comprising retrieving time-stamped text transcripts of interactions of agents of the running campaign from the real-time transcription text database.

According to some embodiments of the present disclosure, operation 230 comprising parsing the retrieved time-stamped text transcripts of interactions of agents of the running campaign via pretrained speech-to-text and Natural Language Processing (NLP) models to yield parsed transcripts and related customer sentiment.

According to some embodiments of the present disclosure, operation 240 comprising comparing the yielded parsed transactions with the retrieved campaign offerings to generate analytical data.

According to some embodiments of the present disclosure, the generated analytical data, such as campaign analytics data 197 in FIG. 1B may include at least one of: (i) agent campaign delivery effectiveness score; and (ii) probability of conversion.

According to some embodiments of the present disclosure, when an agent has an agent campaign delivery effectiveness score below a first threshold excluding the agent from the running campaign and sending the campaign delivery effectiveness score of the agent along with agent details and a preconfigured training list to be assigned to the agent by a Quality Management (QM) application FIG. 3 is an example 300 of a configuration dashboard, in accordance with some embodiments of the present disclosure.

Figure 9:
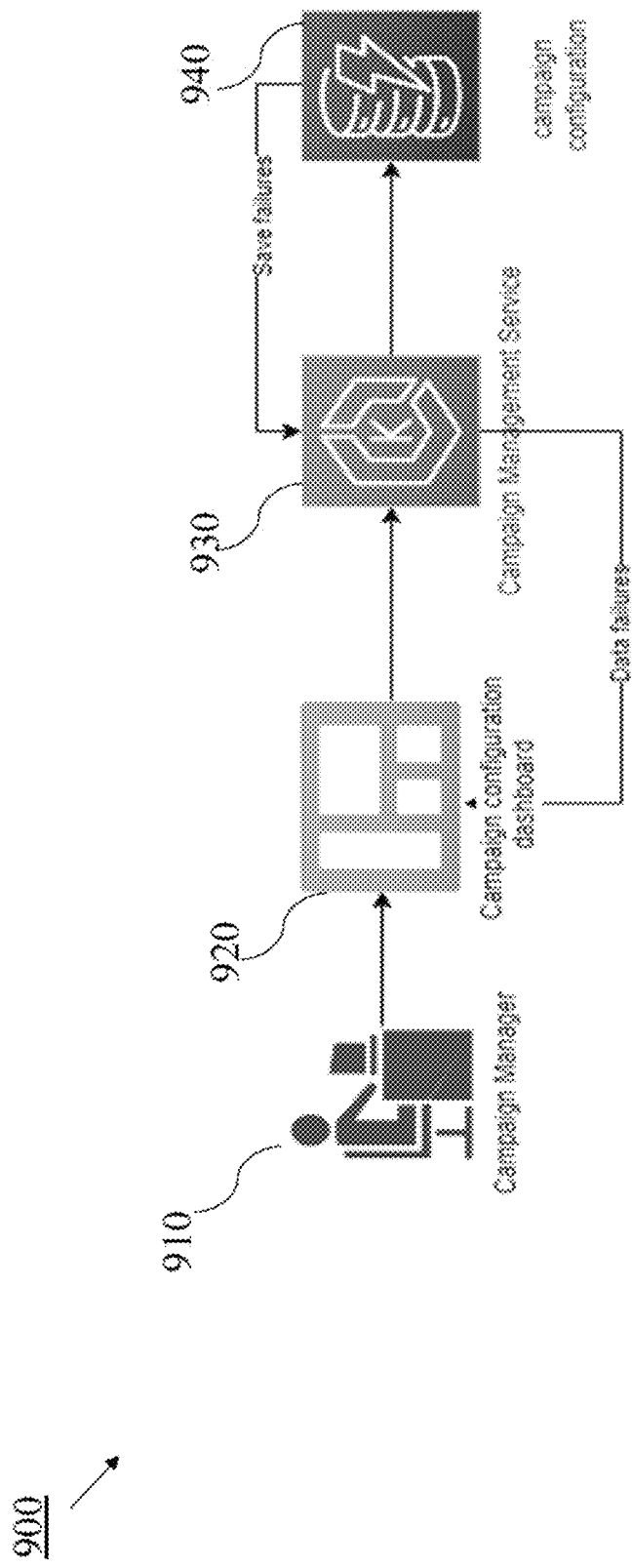
FIG. 9 is a high-level workflow of supporting effective campaign management in a cloud-based contact center platform, in accordance with some embodiments of the present disclosure.

According to some embodiments of the present disclosure, as shown in FIG. 9, a configuration dashboard, such as campaign configuration dashboard 920 in FIG. 9, and such as configuration dashboard 300 and such as campaign configuration dashboard 120*b* in FIG. 1B, may enable a user, such as a campaign manager 910 in FIG. 9, to define the campaign offerings. The campaign offering configurations, via the configuration dashboard 300 may be fed to a service, such as campaign management service 110*b* that may be hosted, for example in Amazon& Elastic Kubernetes Service (EKS) under the provider's account.

According to some embodiments of the present disclosure, the campaign management service may save the campaign configuration in a database, such as campaign configuration database 940 in FIG. 9 and such as campaign configuration database 140*b* in FIG. 1B.

Figure 4A:
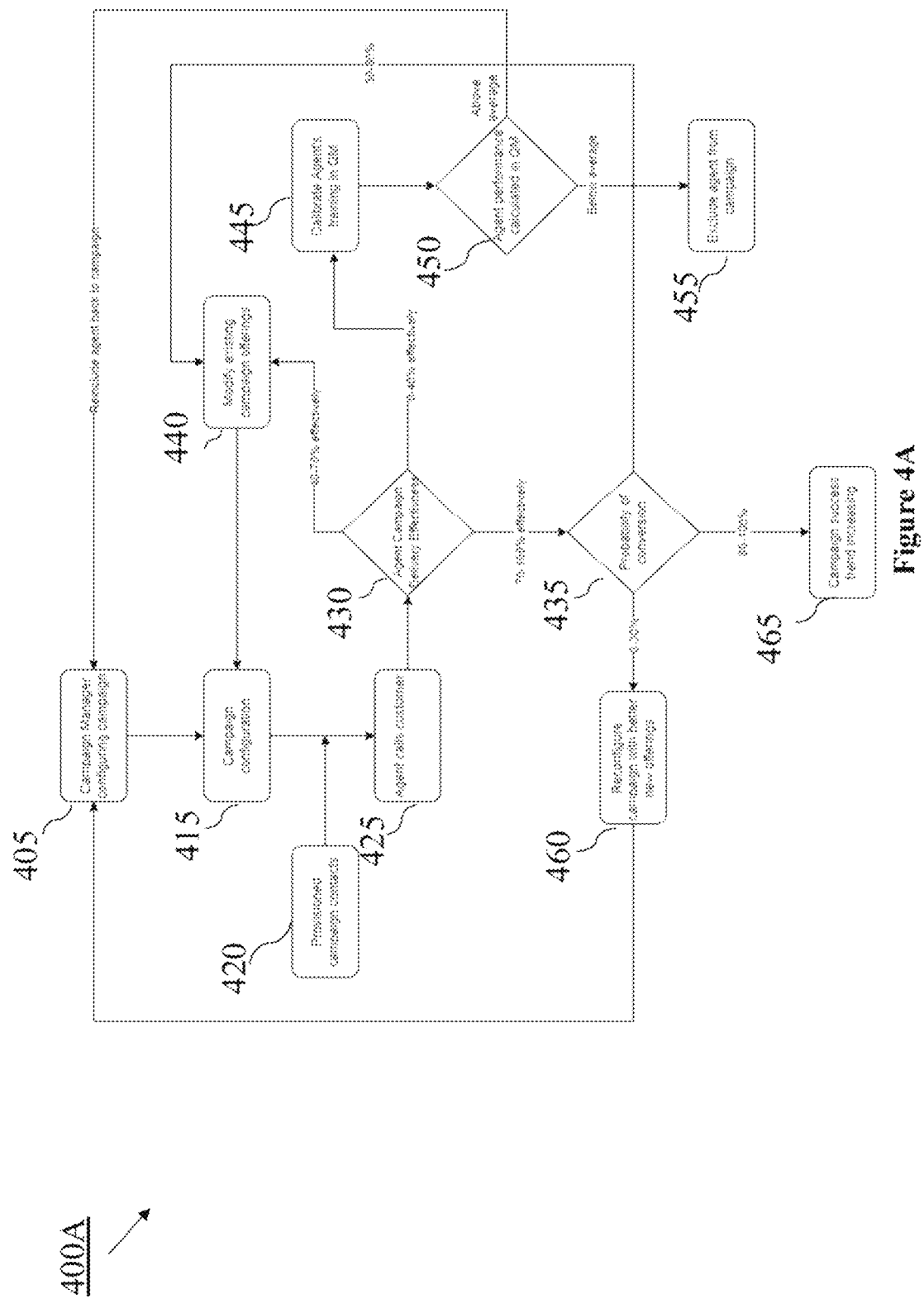
FIG. 4A is a high-level decision diagram of a system for supporting effective campaign management in a cloud-based contact center platform, in accordance with some embodiments of the present disclosure.

FIG. 4 is a high-level decision diagram 400 of a system for supporting effective campaign management in a cloud-based contact center platform, in accordance with some embodiments of the present disclosure.

According to some embodiments of the present disclosure, a user, such as a campaign manager may be configuring a campaign 405 through the portal supplied by the campaign management service, such as campaign management service 110*b* in FIG. 1B. When a campaign 415 has been established and the provisioned of campaign contacts 420 have been received from a service, such as proactive intake service 135 in FIG. 1B, agents may start to initiate calls to prospect customers 425 of the campaign.

According to some embodiments of the present disclosure, the agents may utilize an outbound dialing software, such as outbound dialing software 190 in FIG. 1B to contact prospect customers of the running campaign. A model, such as campaign analytics engine 130*b* in FIG. 1B may operate a conversion model to calculate the agent campaign delivery effectiveness score and the probability of conversion. The conversion model may be implemented by campaign analytics Lambada 195 in FIG. 1B which may verify whether the agent has effectively delivered the campaign offerings to the customer.

According to some embodiments of the present disclosure, the agent campaign delivery effectiveness score may indicate the effectiveness of the agent's delivery, and its range may be configured accordingly. The agent campaign delivery effectiveness may be checked 430.

According to some embodiments of the present disclosure, for example, the score range may be classified into three categories: 'Low', 'Medium', 'High'. 'Low' may be configured when campaign delivered 0-40% effectively. The agent's lower score indicates a failure to communicate the campaign offerings effectively to the customer, highlighting a need for skills training.

According to some embodiments of the present disclosure, calibrate agent's training in the Quality Management service (QM) 445. The conversion model, such as the campaign analytics Lambada 195 in FIG. 1B may trigger modifications to the training plans within the QM, such as QM 180*b* in FIG. 1B. Subsequently, the QM may evaluate the agent performance against these training plans and may automatically determine whether to include the agent back in the running campaign based on a preconfigured performance score. The agent performance may be calculated in the QM 450 and if the score is below average the agent may be excluded from the campaign 455 and if the score is above average the agent may be reincluded back in the campaign.

According to some embodiments of the present disclosure, 'Medium' may be configured when campaign delivered 40-70% effectively. This score range may indicate that the agent performed adequately or well in presenting the campaign to the customer. In this case, the campaign manager responsible for the campaign may consider modifying existing campaign offerings 440, for example by adjusting the offerings to include topics that are more comfortable or easy for the agent to deliver.

According to some embodiments of the present disclosure, 'High' may be configured when campaign delivered 70-100% effectively. This score range may indicate that agent delivered the campaign very well. Therefore, the probability of conversion may be checked 435. When the probability conversion is between 0% and 30% despite the agent's performance in the campaign delivery, it appears that the customer is not inclined towards it. Therefore, there is a need to revamp the campaign offerings to increase the probability of conversion score and the campaign may be reconfigured with better new offerings 460. The campaign may be automatically reconfigured based on a preconfigured offerings list.

According to some embodiments of the present disclosure, when the probability of conversion is between 80% and 100% the campaign success trend may increase 465. This probability of conversion may confirm a successful conversion of the customer.

According to some embodiments of the present disclosure, the conversion model, such as the campaign analytics Lambada 195 in FIG. 1B may execute the logistic Regression model to determine the likelihood of conversion for the customer.

According to some embodiments of the present disclosure, a probability score between 30% and 80% may indicate that the current offerings are not very appealing to the customers and some adjustments may be required to improve conversion rates.

According to some embodiments of the present disclosure, for example, a banking tenant that wants to increase their credit card customers and plans to run a campaign. The banking tenant can categorize the campaign offerings such as for example, Cashback on Gas Payment, Cashback on shopping. Low Annual percent rate (APR), Balance Transfer, and Welcome Bonus. For each offering, questions should be configured, as shown in FIG. 3 that agents can ask during a conversation with prospects. For example, a simple question would be, 'are you looking to earn cashback on your Gas expenses?' Or 'are you spending more on shopping and looking for offers?' Or 'are you willing to receive a welcome bonus on signing up with us?'

Figure 13:
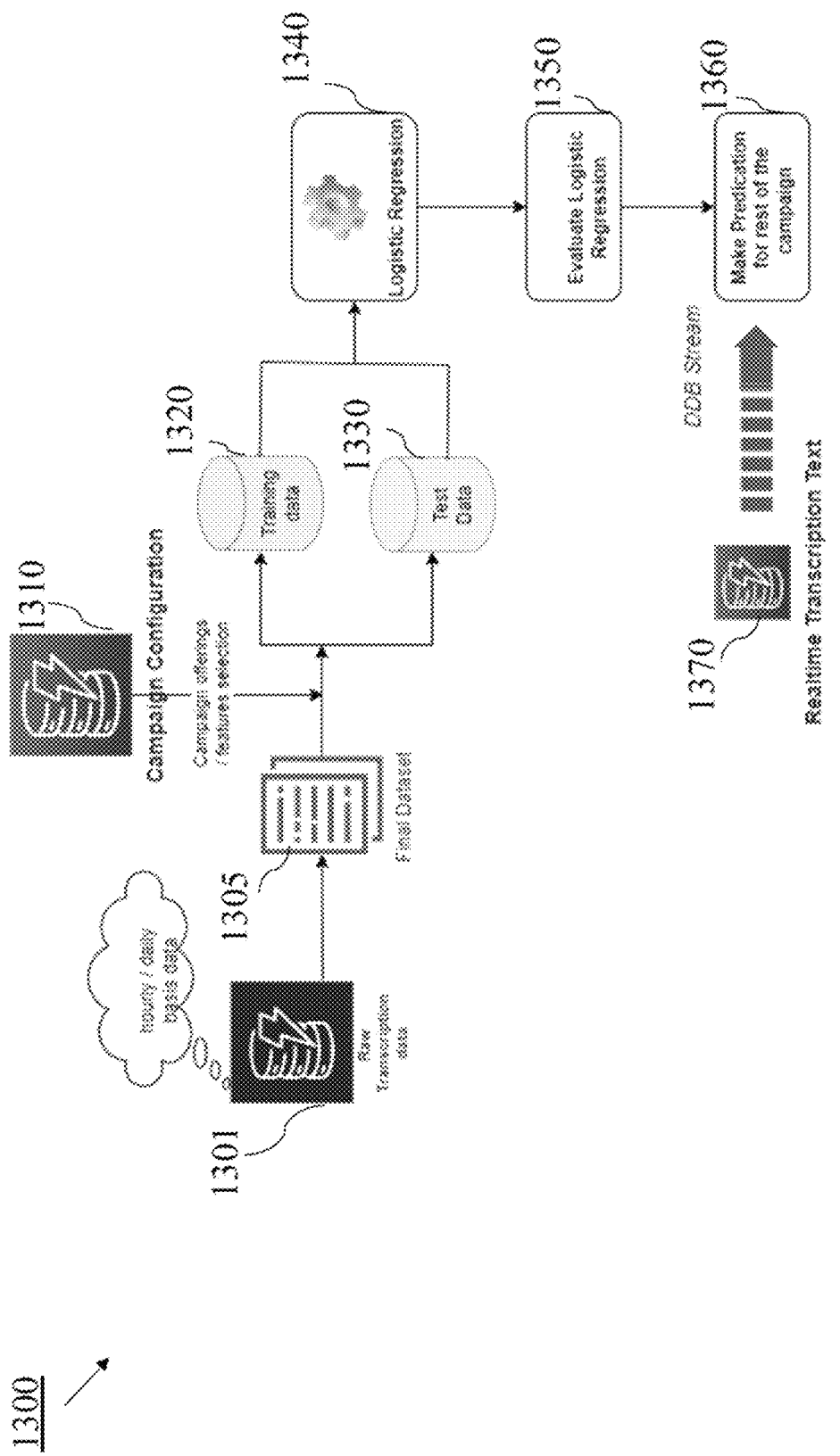
FIG. 13 is a high-level workflow of supporting effective campaign management in a cloud-based contact center platform, in accordance with some embodiments of the present disclosure.

According to some embodiments of the present disclosure, responsive to these questions may be captured in a database, such as real-time transcription text database 160*a* in FIG. 1A along agent details, the model trained as shown in FIG. 13 may provide prediction about successful conversion.

According to some embodiments of the present disclosure, for example, campaign analytics dashboard 1400 in FIG. 14 shows that the proposal of receiving Cashback on Gas Payment was discussed in 250 occasions. A system, such as system 100A and such as system 100B may operate a campaign analytics engine, such as campaign analytics engine 130*a* or 130*b* to identify the prospect customers that are less inclined to purchase the credit card with this offering of Cashback on Gas Payment. Accordingly, this offering may be realigned.

According to some embodiments of the present disclosure, for example, when the prospect customer is identified by the sentiment extracted from conversation then if that sentiment is negative/neutral towards Cashback on Gas Payment then it's concluded that the prospect customer is not interested in the credit card, and hence such offerings are re-aligned by campaign management Microservice (MS) 110*a* in FIG. 1A by leveraging campaign configuration data fed to it by a user that manages the campaign.

According to some embodiments of the present disclosure, in another example, campaign analytics dashboard 1400 in FIG. 14 shows that the Balance transfer offer that is communicated to prospect customers 150 times. A system, such as system 100A and such as system 100B may operate a campaign analytics engine, such as campaign analytics engine 130*a* in FIG. 1A or 130*b* in FIG. 1B may identify prospect customers that expressed interest in purchasing the credit card with this offering. The campaign analytics engine 130*a* in FIG. 1A may operate a conversion model such as campaign Analytics Lambda 195 in FIG. 1B to calculate the probability of customer conversion using Binary Logistic regression and accordingly this offering may be prioritized.

According to some embodiments of the present disclosure, in yet another example, campaign analytics dashboard 1400 in FIG. 14 shows that the offering cashback on shopping was discussed 250 times, but few agents were not able to convey effectively to the prospect determined by using campaign delivery effectiveness score. Hence, using outcome of the logistic regression, a system, such as system 100A in FIG. 1A and system 100B in FIG. 1B may calculate a conversion rate for this offering with respect to agent is lower than a preconfigured threshold and therefore the agent, needs training.

According to some embodiments of the present disclosure, a conversion rate for an offering may be calculated by formula I as follows:

Conversion rate of a single offering=[[(Positive sentiment for prospects interested in an offering+ Positive sentiment for prospects not interested in an offering)]/(Sum of all sentiments for an offering)]*100   (I)

According to some embodiments of the present disclosure, for example, when a running campaign for credit card purchase has been configured to include three offerings, 'Cashback on Gas Payment', 'Low APR' and 'Balance Transfer' to 100 prospect customers, the Binary Logistic Regression may show that 30 prospects are interested in the credit card purchase. For the offering of 'Cashback on Gas Payment', for 30 interested prospects there are 20 positive sentiment, 7 negative sentiment and 3 neutral sentiment, and for 70 not interested prospects there are 15 positive sentiment, 50 negative sentiment and 5 neutral sentiment. Based on formula I the conversion rate for 'Cashback on gas payment' offering may be calculated by the conversion model, such as campaign analytics Lambda 195 in FIG. 1B as follows:

Conversion Rate of 'Cashback on Gas Payment'= [(20+15)/(20+7+3+15+50+5)]*100=35%

Figure 5:
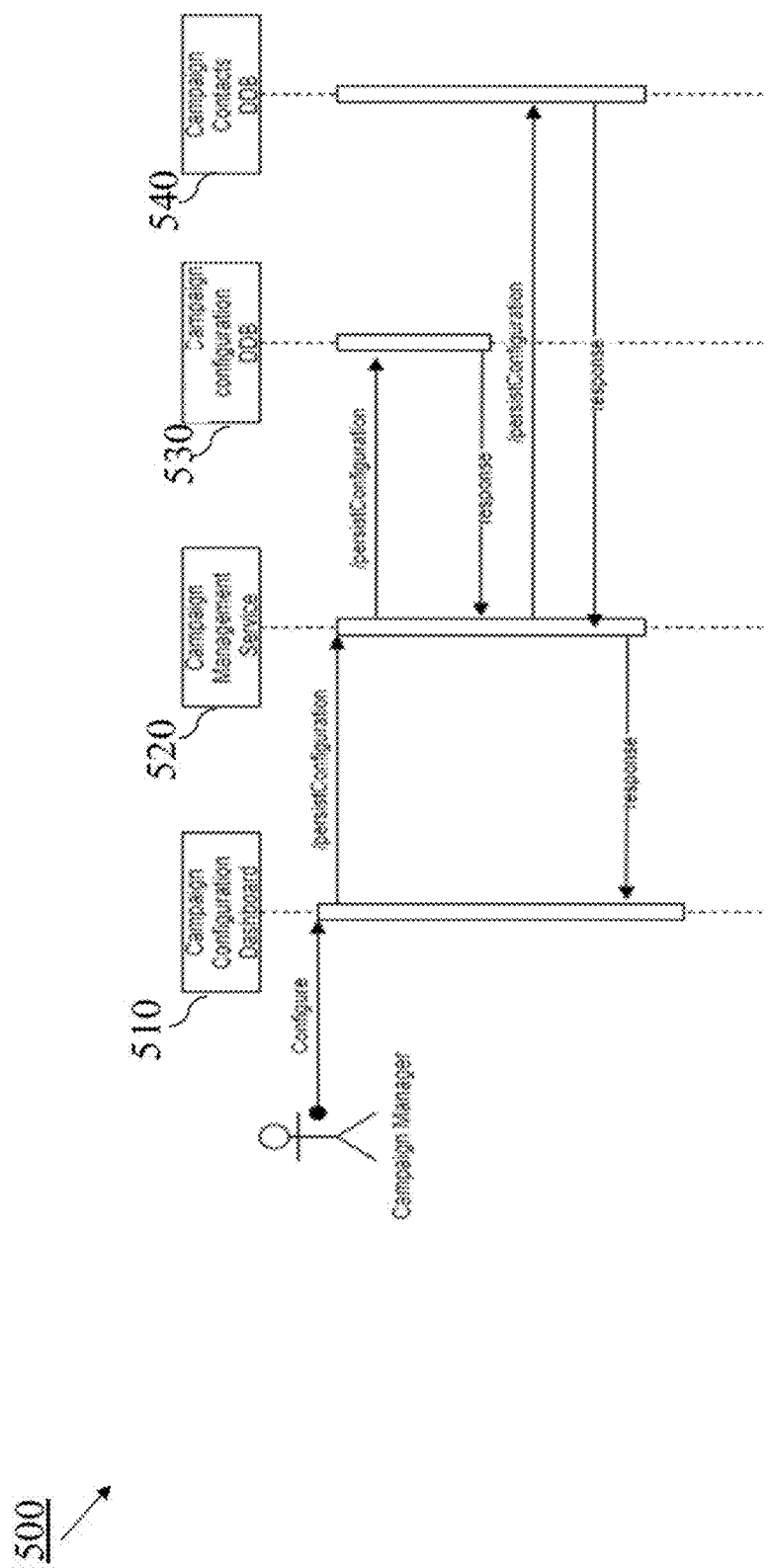
FIG. 5 is a high-level workflow of campaign analytics, in accordance with some embodiments of the present disclosure.

FIG. 5 is a high-level workflow 500 of campaign analytics, in accordance with some embodiments of the present disclosure.

According to some embodiments of the present disclosure, a campaign manager may also configure the prospect customers of the campaign via the campaign configuration dashboard 510, such as campaign configuration dashboard 120*a* in FIG. 1A and such as campaign configuration dashboard 120*b* in FIG. 1B.

Figure 6:
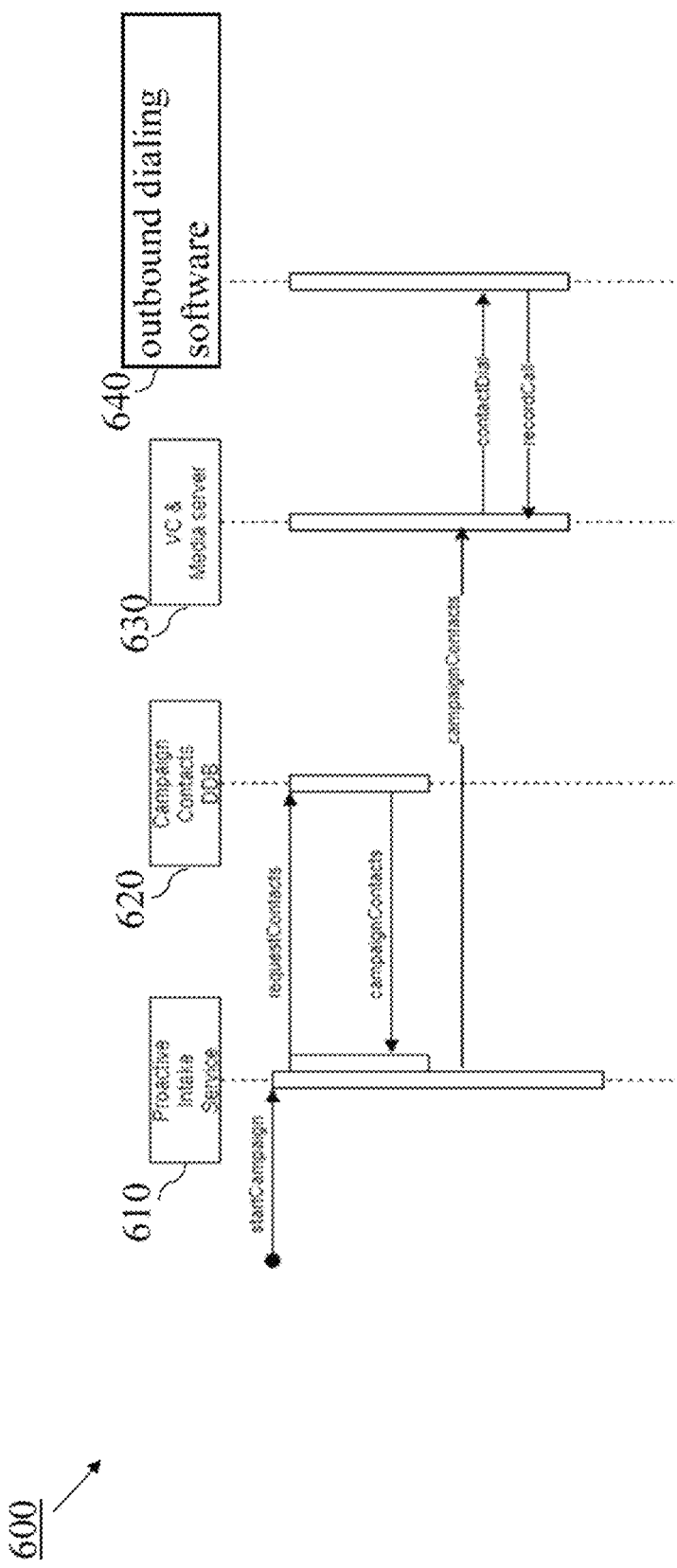
FIG. 6 is a high-level workflow of campaign initiation and running, in accordance with some embodiments of the present disclosure.

According to some embodiments of the present disclosure, when the campaign is initiated, a service such as campaign management service 520 proactive and such as campaign management service 110*b* in FIG. 1B, may retrieve the offerings from a database 530, such as campaign configuration database 140*b* in FIG. 1B and may operate a service such as intake service 135 in FIG. 1B to fetch the campaign contact details from a database 540, such as campaign contacts 165 in FIG. 1B FIG. 6 is a high-level workflow 600 of campaign initiation and running, in accordance with some embodiments of the present disclosure.

According to some embodiments of the present disclosure, when a campaign starts, a service such as proactive intake service 610 and such as proactive intake service 135 in FIG. 1B may communicate to the Virtual Cluster (VC) 185 in FIG. 1B with provisioned campaign contacts. The VC is the application that serves as a backend system integrating with Media Server, outbound dialing software, ACD, and other platforms. Once the proactive intake service 610 has provisioned the necessary contacts i.e., prospective customers for the campaign, from the campaign contacts database 620, such as campaign contacts database 165 in FIG. 1B the contacts are accessible to the outbound dialing software 640. When an agent informs about the provisioned contacts using the outbound dialing software client, the VC receives a notification and requests the media server 630 to commence recording all agent calls related to those contacts.

According to some embodiments of the present disclosure, the outbound dialing software 640, such as outbound dialing software 190 in FIG. 1B is a contact-handling web application that enables interactions with contacts using phone calls, voicemail, email, chat, and work items. The outbound dialing software may provision the contacts and delegate the responsibility to dial to the VC.

According to some embodiments of the present disclosure, agents may dial the provisioned contacts by using the outbound dialing software 640 client and may start communicating the offerings. The dialed provisioned contact may be intercepted by the VC. The media server may start recording the agent calls. The scan service, such as scan service 170 in FIG. 1B may listen to those recordings in real-time using the audio kinesis stream, such as audio kinesis stream 105 in FIG. 1B.

Figure 7:
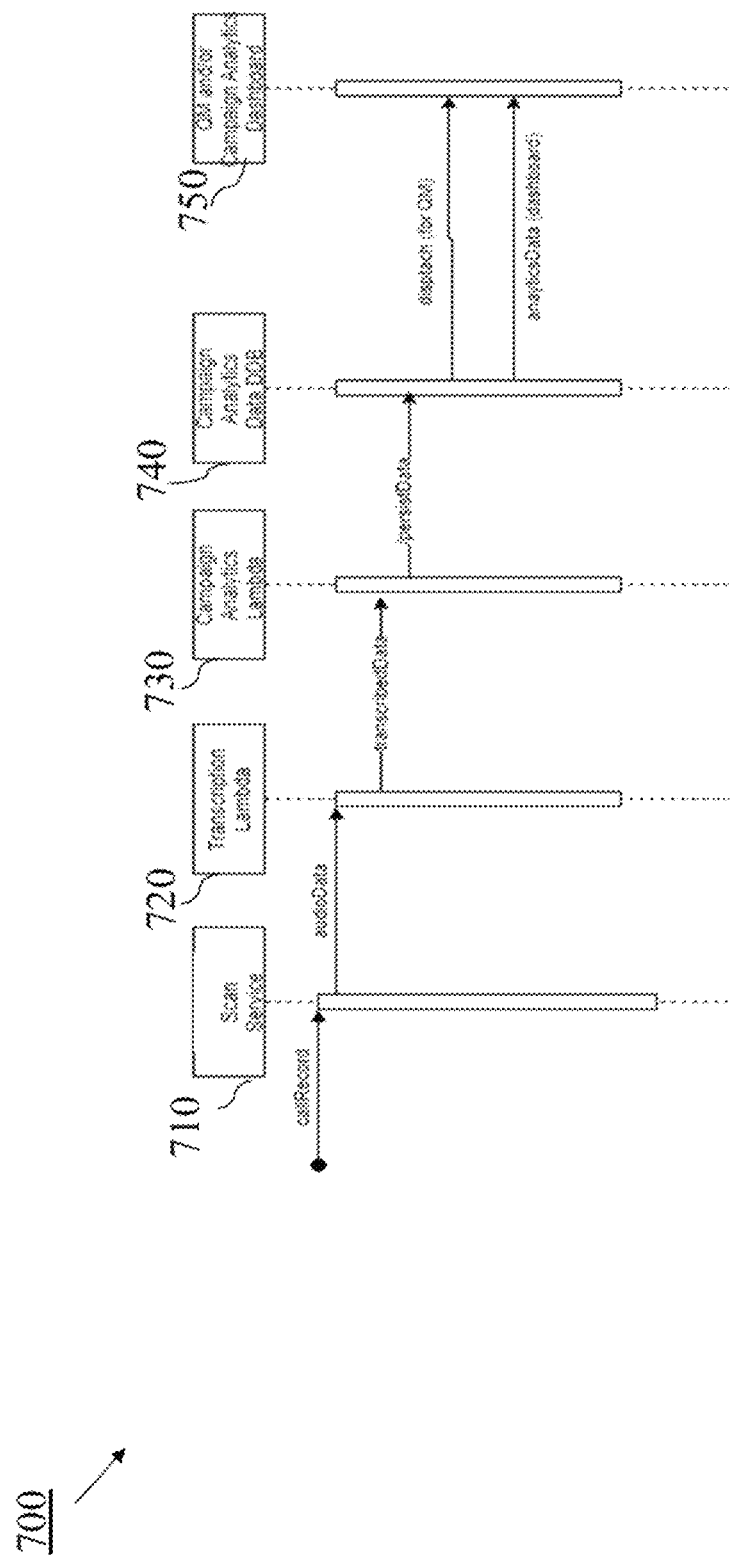
FIG. 7 is a high-level workflow of analytical data generation, in accordance with some embodiments of the present disclosure.

FIG. 7 is a high-level workflow 700 of analytical data generation, in accordance with some embodiments of the present disclosure.

According to some embodiments of the present disclosure, the kinesis stream received from the scan service 710, such as scan service 175 in FIG. 1B may be consumed by Transcription Lambda, such as Transaction Lambda 150*b* in FIG. 1B. The Lambda tech stack and language may receive raw conversation text from Transcription Lambda 720, may transform and stored in a database, such as such as real-time transcription text database 160*a* in FIG. 1A for further analytics.

According to some embodiments of the present disclosure, the transcription text may be stored in a database such as real-time transcription text database 160*a* in FIG. 1A. This stored transcription may be consumed by campaign Analytics lambda 730, for example, binary logistic regression algorithm via DDB stream in real time.

According to some embodiments of the present disclosure, the campaign Analytics lambda 730 logic with logistic regression algorithm, by leveraging Sigmoid function, may generate the analytics data. The campaign analytics lambda 730 may also read the campaign configurations from a database, such as campaign configuration database 140*b* in FIG. 1B to make the analytical decisions. For example, the campaign analytics Lambda 195 in FIG. 1B may require the questions configured in offerings (persisted in campaign configuration database) to crosscheck them against the agent's conversation to calculate the agent campaign delivery effectiveness score. Furthermore, to project the offerings related metrics or charts on campaign dashboard, the campaign analytics lambda needs to have offerings reference such as how many offerings are being offered in the campaign. By reading the campaign configuration database 140*b* in FIG. 1B, these reference points may be available to campaign analytics Lambda.

According to some embodiments of the present disclosure, the analytics data is then stored in a database, such as campaign analytics data Dynamo Database (DDB) table 740. A service, such as campaign management service 110*b* in FIG. 1B may be notified for new analytical data in respective DDB table using DDB triggers. That may ensure that the campaign management service may fetch the latest updated data from the DDB table. The campaign management service may present the analytics data to a user via a campaign analytics dashboard 750, such as campaign analytics dashboard 1400 in FIG. 14.

Figure 8:
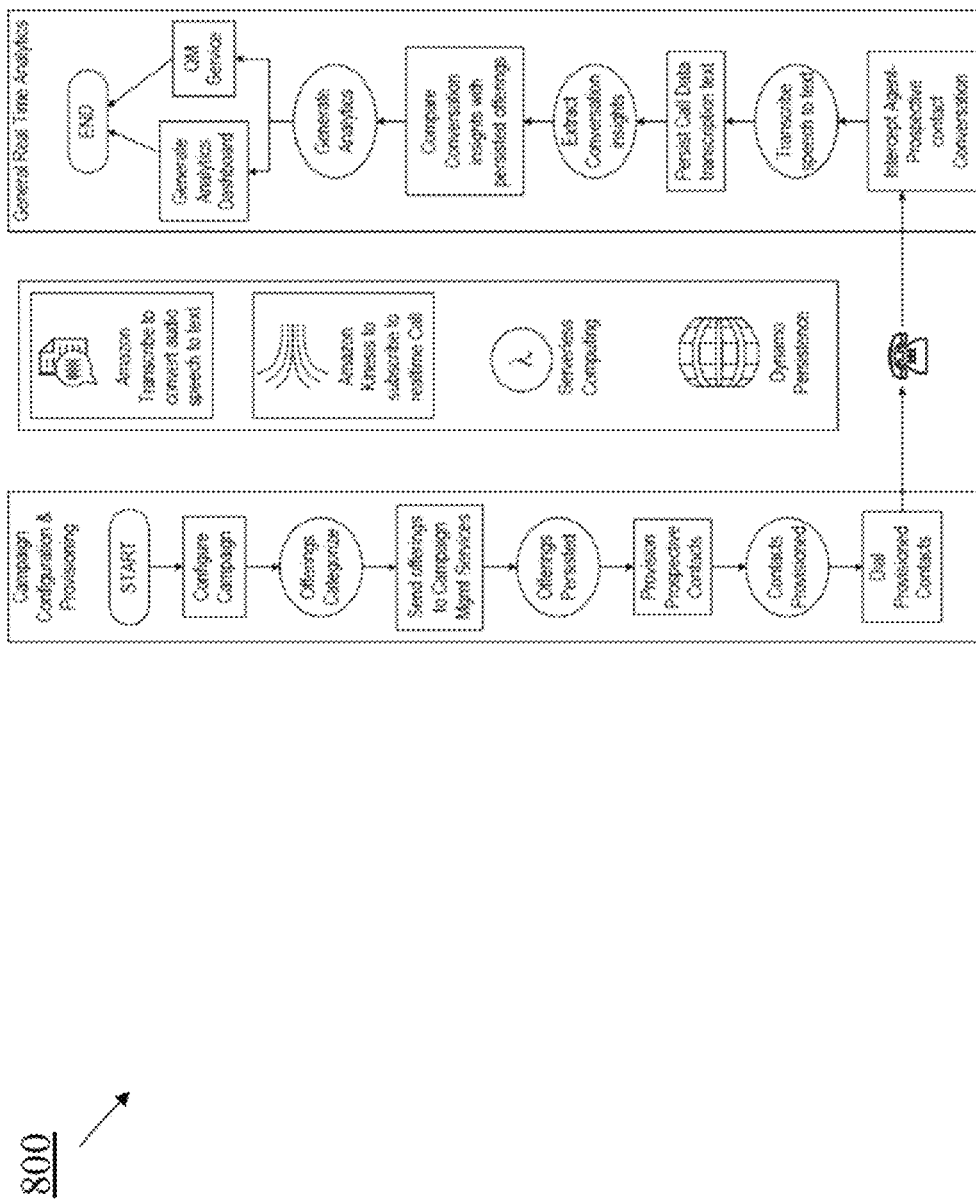
FIG. 8 is a high-level workflow of campaign analytics Lambda, in accordance with some embodiments of the present disclosure.

FIG. 8 is a high-level workflow 800 of campaign analytics Lambda, in accordance with some embodiments of the present disclosure.

According to some embodiments of the present disclosure, users, such as campaign managers may log on to campaign configuration dashboard to configure campaign. Once, campaign offerings are defined, campaign managers may design questions that agents should ask to prospective customers to gather information which will be used for sentiment analytics.

According to some embodiments of the present disclosure, for example, a campaign such as credit card campaign may have offerings and relevant questions such as for example, Cashback on Gas Payment—'Are you interested in receiving cashback for your Gasoline Expenditures' 'Are you interested in receiving a 2% cashback when you use our Credit Card?' 'We are pleased to offer this benefit to our valued clients.' Cashback on Grocery Shopping—'We are providing a 7% cashback offer on purchases made for groceries. Would you like to take advantage of this opportunity?' Low APR—'We have additional options available that may interest you. Could you please provide information on the percentage of APR offered by your current credit card?' Balance Transfer—'We have more to offer you than just this. In the event that you have an unpaid balance on your current credit card, and you wish to transfer it to an American Express Card, there will be no charge for doing so. Would you like to avail this offer?' Welcome Bonus— 'Would you be interested in earning bonus points when you apply for a credit card? American Express offers a bonus of 2000 points that can be redeemed at major retailers such as Walmart and Best Buy.'

Figure 10:
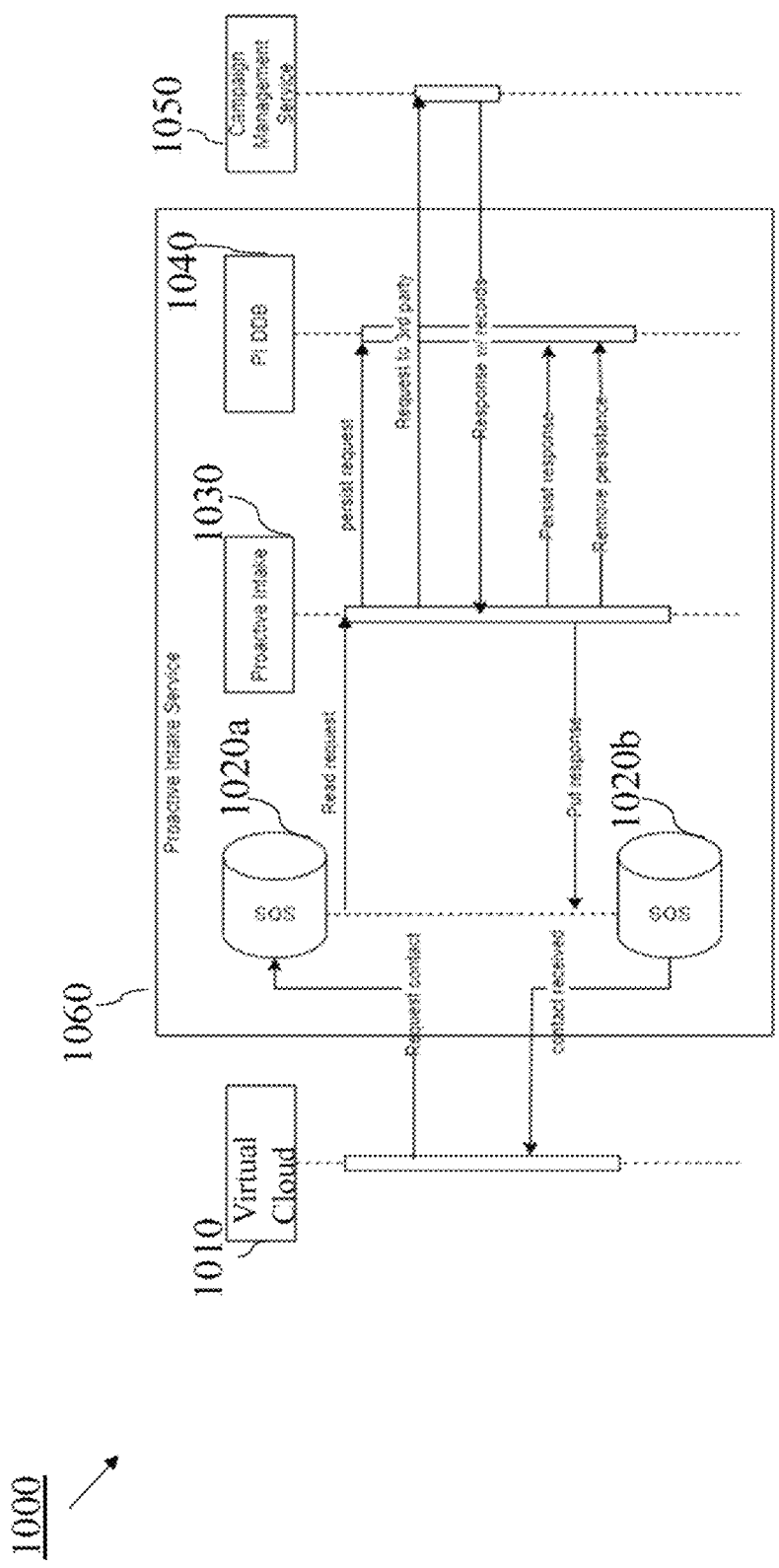
FIG. 10 is a high-level workflow of campaign initiation, in accordance with some embodiments of the present disclosure.

FIG. 10 is a high-level workflow 1000 of campaign initiation, in accordance with some embodiments of the present disclosure.

According to some embodiments of the present disclosure, a proactive intake microservice, such as proactive intake microservice 1060 and such as proactive intake service 135 in FIG. 1B may have the ability to process requesting contacts to be provisioned from campaign management service 1050, e.g., a third-party tenant and may store them to campaign contacts DDB. Later, when the campaign begins, the Virtual Cluster (VC) 1010 may request the proactive intake service 1060 to provide contacts from the third-party tenant which has initiated the campaign for outbound dialing through software.

According to some embodiments of the present disclosure, a system, such as system 100B may operate a service such as proactive intake service 1060 and such as proactive intake service 135 in FIG. 1B to fetch contacts from a third party i.e., provisioned campaign contacts and provide those contact to VC 185 in FIG. 1B via SQS queue 1020*a*-1020*b* for the outbound dialing process.

Figure 11:
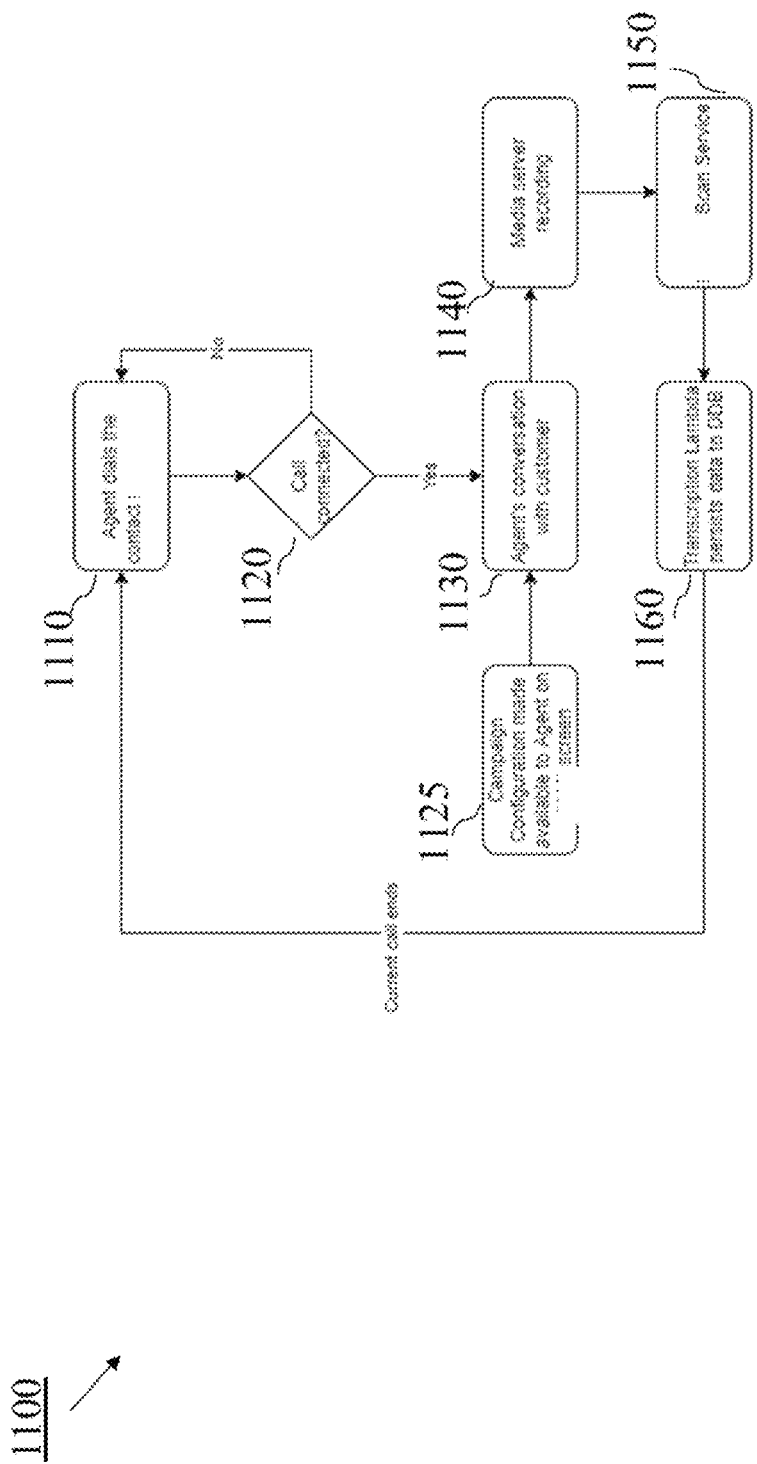
FIG. 11 is a high-level workflow of speech to text conversion via automatic speech recognition service, in accordance with some embodiments of the present disclosure.

FIG. 11 is a high-level workflow 1100 of speech to text conversion via automatic speech recognition service, in accordance with some embodiments of the present disclosure.

According to some embodiments of the present disclosure, when an agent may dial to contact 1110 it and call data may be intercepted by the campaign analytics Lambda's transcribe process in real time which may convert speech to text. There is an integration with the campaign management microservice, such as campaign management service 120*b* in FIG. 1B to provide campaign configuration data i.e., campaign offerings and underlying questions to the agent while talking to customer 1125.

According to some embodiments of the present disclosure, for example, the credit card campaign questions, as shown in FIG. 3 may be presented to agent on the outbound dialing software for a reference during the campaign delivery. While an agent is talking to a customer 1130, the media server 1140 and scan service 1150 may stream audio conversation to an audio Kinesis stream, such as audio Kinesis stream 105 in FIG. 1B.

According to some embodiments of the present disclosure, the audio Kinesis stream may have Transcription Lambda consumer which may convert speech to text in real time by using automatic speech recognition service. The audio Kinesis stream may be converted into the text format with by using automatic speech recognition service. This converted data is the questions that have been configured in campaign offerings, and answers responded by the customer to the agents in raw format.

According to some embodiments of the present disclosure, this raw formatted text may be mapped to Dynamo DB row in key-value format. e.g., "campaignId, customerId, customerName, agentId, question1, answer1, question2, answer2, question3, answer3, finalPrediction" for each agent-customer conversation into a new Dynamo DB. These values may be consumed by the Sigmoid function.

According to some embodiments of the present disclosure, analytics data may be generated by comparing real-time conversation insights and configured campaign offerings. A Dynamo DB stream may be configured that may trigger campaign analytics Lambda which may train and test the model, such as conversion based on hourly/daily data received from ongoing campaign and will perform real-time predication using sigmoid function for the rest of the campaign.

According to some embodiments of the present disclosure, agent campaign delivery effectiveness score and probability of conversion may be used to determine inputs to Quality Management (QM) application, such as QM application 180*b* in FIG. 1B for agents training as well as notify Campaign Managers for campaign re-alignment if required as shown in FIG. 4. Customer sentiment may be used for decision making, against each of the offering that was discussed with the prospect customer.

According to some embodiments of the present disclosure, the scores generated by Campaign Analytics Lambda which has the prospect's sentiment analytics may then be persisted to Dynamo DB Campaign Analytics Data. The Campaign Management Microservice will then fetch analytics data from campaign analytics data Dynamo DB and may integrate with the campaign analytics dashboard that may provide campaign analytics results including campaign summary, offerings analytics, sentiments of Prospects etc. as shown in dashboard 1400 in FIG. 14.

FIG. 12 is a graph 1200 showing probability of campaign offerings that a customer is interested in, in accordance with some embodiments of the present disclosure.

According to some embodiments of the present disclosure, Sigmoid function in logistic regression may be used. Binary Logistic Regression may be a supervised classification algorithm that takes discrete values as input. The model that it creates is regression-based and predicts if the probability of a given data belongs to '0' and '1'.

According to some embodiments of the present disclosure, how likely the prospect customer can accept the campaign offerings, and lead to successful conversion or not, may be measured. The plotted scatter graph against the test dataset shows the number of offerings in which customer is interested and respective probability for the successful conversion.

According to some embodiments of the present disclosure, the 'S-shaped curve that can take number of offerings that the customer is interested in and map them to a value between 0 and 1.

According to some embodiments of the present disclosure, the Sigmoid function may be $$\mathrm{sigmoid}(z) = \frac{1}{1+e^{-z}}$$

Where e is a Euler's number with the following value e=2.71828

Sigmoid function converts the input into range '0' to '1'.

FIG. 13 is a high-level workflow 1300 of supporting effective campaign management in a cloud-based contact center platform, in accordance with some embodiments of the present disclosure.

According to some embodiments of the present disclosure, raw transcription data 1301 may be retrieved to generate a final dataset 1305. Campaign offerings and features selection may be retrieved form campaign configuration database 1310 and stored in training data database 1320 and test data database 1330

According to some embodiments of the present disclosure, the data from training data database 1320 and test data database 1330 may be forwarded to a logistic regression 1340 to evaluate logistic regression 1350 and make prediction for rest of the campaign 1360 based on real-time transcription text 1370.

FIG. 14 is an example 1400 of a campaign analytics dashboard, in accordance with some embodiments of the present disclosure.

According to some embodiments of the present disclosure, campaign analytics dashboard 1400 includes a proposal of receiving Cashback on Gas Payment was discussed on 250 occasions. However, the model may identify prospective customers that seem to be less inclined to purchase the credit card with this particular offering. Therefore, it is necessary to realign this offering.

According to some embodiments of the present disclosure, campaign analytics dashboard 1400 also includes Balance transfer offer that is communicated to potential customers 150 times, and a model will identify a significant number of them expressed interest in purchasing the credit card with this offering.

According to some embodiments of the present disclosure, campaign analytics dashboard 1400 includes the offering cashback on shopping was discussed 250 times, but few agents were not able to convey effectively to the prospect. Hence, using outcome of logistic regression, the system, such as system 100A in FIG. 1A and system 100B in FIG. 1B may calculate a conversion rate for this offering with respect to agent is less and therefore those agents need training.

According to some embodiments of the present disclosure, campaign analytics dashboard 1400 includes Campaign Summary that shows the overall conversions. Campaign statistics which portraits the campaign success rate. The number of QM trainings modifications done automatically by the Campaign Management. Campaign offering discussed shows which all offerings are being discussed the most hence, the less discussed offerings can be reconfigured for better visibility. Campaign Offerings Analytics: shows an analysis per offering. It shows which offering discussion led to QM training plan changes and which offerings needs reconfigurations.

According to some embodiments of the present disclosure, campaign analytics dashboard 1400 further includes Successful campaign offerings which is Heatmap of offering's success. It denotes which offerings lead to more successful conversions. Prospective Contacts Sentiments which is a customer sentiments metric.

According to some embodiments of the present disclosure, the campaign management service, such as campaign management service 110*b* in FIG. 1B, may present analytics data to the QM application to automate agent training plan. The QM application, such as QM 180*b* in FIG. 1B may be a Quality Management service which is aimed at defining, managing and tracking the agent's performance via training program. The different analytics metrics on the dashboard may assist a campaign manager to determine ongoing success rate and tweak offerings or shortlist agents for trainings while the campaign is still running.

According to some embodiments of the present disclosure, the campaign analytics dashboard may be integrated with an ACD UI using micro frontend integration and an html frame in the ACD UI, this html frame may populate campaign analytics dashboard data, which may be accessible and managed by a campaign manager. After initiating the campaign, agents will start making calls using the configured questions. For example, when a credit card campaign is planned for a duration of three weeks, sample data may be collected based on an hourly basis. The collected data may be fed to a Binary Logistic Regression Algorithm, e.g., campaign analytics lambda that may train the conversion model and generate predictions regarding whether customers will convert or not for the remainder of the campaign.

According to some embodiments of the present disclosure, an engine, such as campaign analytics engine 130*a* in FIG. 1A may generate relevant data that may be displayed on the campaign analytics dashboard 1400. Credit card offerings which were most frequently discussed, may be identified as well as which offerings were least discussed, and which offerings had high discussions but low conversion rates.

According to some embodiments of the present disclosure, the campaign analytics dashboard may enable the Credit Card Campaign manager to gain valuable insights and take necessary actions.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A system for supporting effective campaign management in a cloud-based contact center platform, said system comprising:
    a Microservice (MS) for campaign management of a tenant connected to the cloud-based contact center platform;
    a campaign configuration dashboard connected to the MS for campaign management for configuration of campaign offerings of the tenant to be stored in a campaign database;
    a transcription serverless computing platform to receive time-stamped text transcripts from an automatic speech recognition service and store it in a real-time transcription text database, wherein the time-stamped text transcripts are based on real-time outbound interactions by agents of the tenant, which are intercepted from a contact-handling web application that is integrated to the MS for campaign management of the tenant, and
    a campaign analytics engine integrated to the cloud-based contact center platform, said campaign analytics engine comprising:
    retrieving campaign offerings of a running campaign from the campaign database;
    retrieving time-stamped text transcripts of interactions of agents of the running campaign from the real-time transcription text database;
    parsing the retrieved time-stamped text transcripts of interactions of agents of the running campaign via pretrained speech-to-text and Natural Language Processing (NLP) models to yield parsed transcripts and related customer sentiment; and
    comparing the yielded parsed transactions with the retrieved campaign offerings to generate analytical data,
    wherein the generated analytical data includes at least one of: (i) agent campaign delivery effectiveness score; and (ii) probability of conversion,
    wherein when an agent has an agent campaign delivery effectiveness score below a first threshold excluding the agent from the running campaign and sending the campaign delivery effectiveness score of the agent along with agent details and a preconfigured training list to be assigned to the agent by a Quality Management (QM) application, and
    wherein when the probability of conversion is below a second threshold automatically reconfiguring the campaign offerings based on predetermined offerings.

2. The system of claim 1, wherein the agent campaign delivery effectiveness score determines voice interaction capabilities and wherein the agent campaign delivery effectiveness score is calculated by:
    identifying offerings of the campaign offerings in the yielded parsed transcripts where related interactions thereof are:
    (i) having positive customer sentiment to count a number of positive offerings;
    (ii) having negative customer sentiment to count a number of negative offerings; and
    (iii) having neutral customer sentiment to count a number of neutral offerings;
    identifying offerings of the campaign offerings which are not mentioned in the yielded parsed transcripts to count a number of offerings not discussed;
    summing the number of negative offerings, the number of neutral offerings and the number of offerings not discussed to yield a sum of non-positive offerings; and
    dividing the number of positive offerings by the sum of non-positive offerings to yield the agent campaign delivery effectiveness score.

3. The system of claim 1, wherein the probability of conversion is calculated by a conversion model, said conversion model is trained by:
    (i) providing a dataset of interactions and associated customer sentiment, wherein the customer sentiment is selected from: (a) positive; (b) negative; and (c) neutral;
    converting each interaction and associated customer sentiment in the dataset into binary features to yield a converted dataset;
    training the conversion model based on a first portion of the converted dataset by using a supervised classification algorithm, to predict likelihood of customer getting converted by campaign offerings,
    wherein the supervised classification algorithm is a binary logistic regression; and (ii) using a second portion of the converted dataset for testing of the conversion model.

4. The system of claim 1, wherein after a calibrated training of the agent and training thereof operating an agent performance calculation and when the calculated agent performance is above a third threshold the agent is reincluded in the running campaign.

5. The system of claim 1, wherein the running campaign has been configured via the campaign configuration dashboard to include one or more campaign offerings and one or more customers which are prospects of the running campaign, and wherein the campaign offerings comprising a question bank as a guideline that agents will follow when talking to the customers which are prospects of the running campaign.

6. The system of claim 1, wherein the campaign configuration dashboard is implemented as a web application and integrated seamlessly with the MS for campaign management.

7. The system of claim 1, wherein the campaign database and the real-time transcription text database are each implemented by a non-relational database service, managed by the platform for cloud computing services.

8. The system of claim 1, wherein the campaign analytics engine is implemented by a campaign analytics serverless computing platform, and
wherein the campaign analytics serverless computing platform is training and testing the campaign analytics engine based on periodic data of the ongoing campaign retrieved from the real-time transcription text database to generate the analytical data.

9. The system of claim 8, wherein the periodic data is time-stamped text transcripts of interactions related to the running campaign.

10. The system of claim 2, wherein a media server is configured to record agent interactions and forward audio data of each recorded interaction to a listening service that feeds the audio data to a serverless streaming data service to get real-time interaction data and wherein the automatic speech recognition service is configured to generate time-stamped text transcripts from the real-time interaction data and store it in the real-time transcription text database.

11. The system of claim 10, wherein the time-stamped text transcripts are generated after the campaign analytics engine is receiving a notification from the tenant as to the running campaign and requesting the media server to commence recording interactions related to the one or more customers which are prospects of the running campaign.

12. The system of claim 1, wherein the analytical data further includes campaign offerings having customer interest below a preconfigured level and reasons for customer interest below the preconfigured level.

13. A computer-implemented method for supporting effective campaign management in a cloud-based contact center platform, said computer-implemented method comprising:
 operating a campaign analytics engine integrated to the cloud-based contact center platform, said campaign analytics engine comprising:
 retrieving campaign offerings of a running campaign from the campaign database;
 retrieving time-stamped text transcripts of interactions of agents of the running campaign from the real-time transcription text database,
 wherein the time-stamped text transcripts are based on real-time outbound interactions by agents of the tenant, which are intercepted from a contact-handling web application that is integrated to the MS for campaign management of the tenant,
 parsing the retrieved time-stamped text transcripts of interactions of agents of the running campaign via pretrained speech-to-text and Natural Language Processing (NLP) models to yield parsed transcripts and related customer sentiment; and
 comparing the yielded parsed transactions with the retrieved campaign offerings to generate analytical data,
 wherein the generated analytical data includes at least one of: (i) agent campaign delivery effectiveness score; and (ii) probability of conversion, and
 wherein when an agent has an agent campaign delivery effectiveness score below a first threshold excluding the agent from the running campaign and sending the campaign delivery effectiveness score of the agent along with agent details and a preconfigured training list to be assigned to the agent by a Quality Management (QM) application, and
 wherein when the probability of conversion is below a second threshold automatically reconfiguring the campaign offerings based on predetermined offerings.

* * * * *